United States Patent
Thompson et al.

(10) Patent No.: US 10,323,393 B2
(45) Date of Patent: *Jun. 18, 2019

(54) APPARATUS AND CONTROL SYSTEM FOR MULTI-GESTURAL CONTROL OF WATER DELIVERY DEVICES

(71) Applicant: Kohler Mira Limited, Gloucestershire (GB)

(72) Inventors: Christopher Ian Thompson, Bristol (GB); Xiangzhen Zhu, Cheltenham (GB)

(73) Assignee: KOHLER MIRA LIMITED (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/703,003

(22) Filed: Sep. 13, 2017

(65) Prior Publication Data

US 2018/0002904 A1 Jan. 4, 2018

Related U.S. Application Data

(63) Continuation of application No. 14/693,447, filed on Apr. 22, 2015, now Pat. No. 9,783,964.
(Continued)

(51) Int. Cl.
*E03C 1/05* (2006.01)
*E03B 7/07* (2006.01)
(Continued)

(52) U.S. Cl.
CPC .............. *E03B 7/075* (2013.01); *E03C 1/055* (2013.01); *E03C 1/057* (2013.01); *F16K 11/02* (2013.01);
(Continued)

(58) Field of Classification Search
CPC ..... Y10T 137/87571; Y10T 137/87676; Y10T 137/87579; Y10T 137/87692;
(Continued)

(56) References Cited

U.S. PATENT DOCUMENTS 3,556,146 A 1/1971 Groen
5,694,653 A * 12/1997 Harald .................... E03C 1/057
4/559
(Continued)

FOREIGN PATENT DOCUMENTS

DE 102005028600 1/2007
DE 102007009038 8/2008
(Continued)

OTHER PUBLICATIONS

The Practice and Reflection of a SCM Worker (English translation); 6 pages.
(Continued)

*Primary Examiner* — Matthew W Jellet
(74) *Attorney, Agent, or Firm* — Foley & Lardner LLP

(57) ABSTRACT

A water delivery device includes a body, a user interface, a mixing valve, a first capacitive sensor pad, and a second capacitive sensor pad. The body includes a spout. The user interface is provided on the spout. The mixing valve is contained within the body and is configured to be in fluid communication with a hot water source and a cold water source. The first capacitive sensor pad is provided below the user interface. The second capacitive sensor pad is provided below the user interface laterally adjacent to the first capacitive sensor pad, and is physically separated from the first capacitive sensor pad.

17 Claims, 18 Drawing Sheets

Related U.S. Application Data

(60) Provisional application No. 61/982,999, filed on Apr. 23, 2014.

(51) Int. Cl.
| | | |
|---|---|---|
| *F16K 11/00* | (2006.01) | |
| *F16K 31/02* | (2006.01) | |
| *G05D 7/06* | (2006.01) | |
| *G01V 3/08* | (2006.01) | |
| *G05D 23/13* | (2006.01) | |
| *F16K 11/02* | (2006.01) | |
| *G05B 15/02* | (2006.01) | |

(52) U.S. Cl.
CPC ............ *F16K 19/006* (2013.01); *F16K 31/02* (2013.01); *G01V 3/08* (2013.01); *G05B 15/02* (2013.01); *G05D 7/0635* (2013.01); *G05D 23/1393* (2013.01); *Y10T 137/8766* (2015.04); *Y10T 137/87579* (2015.04)

(58) Field of Classification Search
CPC ..... Y10T 137/87684; Y10T 137/87652; Y10T 137/8766; Y10T 137/87668; E03C 1/057; E03C 1/055; E03C 1/05; E03C 2001/0418; F16K 31/02; F16K 19/006; E03B 7/075; G05B 15/02; G05D 23/1393; G05D 7/0635; G01V 3/08
See application file for complete search history.

(56) References Cited

U.S. PATENT DOCUMENTS

| | | | |
|---|---|---|---|
| 5,855,356 | A | 1/1999 | Fait |
| 6,286,764 | B1 | 9/2001 | Garvey et al. |
| 6,321,785 | B1 * | 11/2001 | Bergmann ............... E03C 1/057 137/606 |
| 6,337,635 | B1 | 1/2002 | Ericksen |
| 6,501,576 | B1 | 12/2002 | Seacombe |
| 6,513,787 | B1 | 2/2003 | Jeromson |
| 6,707,030 | B1 | 3/2004 | Watson |
| 6,734,685 | B2 | 5/2004 | Rudrich |
| 6,955,333 | B2 | 10/2005 | Patterson et al. |
| 6,964,404 | B2 | 11/2005 | Patterson et al. |
| 7,099,649 | B2 | 8/2006 | Patterson et al. |
| 7,104,519 | B2 | 9/2006 | O'Maley et al. |
| 7,177,725 | B2 | 2/2007 | Nortier et al. |
| 7,313,333 | B2 | 12/2007 | Lee et al. |
| 7,376,351 | B2 | 5/2008 | Patterson et al. |
| 7,743,782 | B2 | 6/2010 | Jost |
| 8,089,473 | B2 | 1/2012 | Koottungal |
| 8,118,240 | B2 | 2/2012 | Rodenbeck et al. |
| 8,127,229 | B2 | 2/2012 | Inoguchi et al. |
| 8,162,236 | B2 | 4/2012 | Rodenbeck et al. |
| 8,243,040 | B2 | 8/2012 | Koottungal |
| 8,333,361 | B2 | 12/2012 | McTargett |
| 8,365,767 | B2 | 2/2013 | Davidson et al. |
| 8,376,313 | B2 | 2/2013 | Burke et al. |
| 8,413,952 | B2 | 4/2013 | Lang et al. |
| 8,418,993 | B2 | 4/2013 | Chen |
| 8,516,628 | B2 | 8/2013 | Conroy |
| 8,807,521 | B2 | 8/2014 | Dunki-Jacobs et al. |
| 8,827,239 | B2 | 9/2014 | Chen |
| 8,827,240 | B2 | 9/2014 | Chen |
| 8,944,105 | B2 | 2/2015 | Rodenbeck et al. |
| 9,027,574 | B2 | 5/2015 | Kosugi et al. |
| 9,175,458 | B2 | 11/2015 | Meehan et al. |
| 9,194,110 | B2 | 11/2015 | Frick et al. |
| 9,243,756 | B2 | 1/2016 | Davidson et al. |
| 9,260,842 | B2 | 2/2016 | Peel |
| 9,315,976 | B2 | 4/2016 | Rodenbeck et al. |
| 9,783,964 | B2 * | 10/2017 | Thompson ......... G05D 23/1393 |
| 2002/0019709 | A1 | 2/2002 | Segal |
| 2003/0088338 | A1 | 5/2003 | Phillips et al. |
| 2004/0256009 | A1 | 12/2004 | Valenzuela |
| 2005/0082503 | A1 | 4/2005 | Patterson et al. |
| 2005/0117912 | A1 | 6/2005 | Patterson et al. |
| 2005/0140521 | A1 | 6/2005 | Lin et al. |
| 2005/0171709 | A1 | 8/2005 | Nortier et al. |
| 2006/0214016 | A1 | 9/2006 | Erdely |
| 2006/0231638 | A1 | 10/2006 | Belz et al. |
| 2007/0113331 | A1 | 5/2007 | Prokopenko et al. |
| 2007/0246550 | A1 | 10/2007 | Rodenbeck et al. |
| 2008/0271238 | A1 | 11/2008 | Reeder et al. |
| 2009/0039176 | A1 | 2/2009 | Davidson |
| 2009/0056011 | A1 | 3/2009 | Wolf et al. |
| 2009/0261282 | A1 | 10/2009 | Connors |
| 2009/0293192 | A1 | 12/2009 | Pons |
| 2012/0022803 | A1 | 1/2012 | Donnelly et al. |
| 2012/0031498 | A1 | 2/2012 | Carmel et al. |
| 2012/0096637 | A1 | 4/2012 | Laflamme et al. |
| 2012/0192965 | A1 | 8/2012 | Popper et al. |
| 2012/0266973 | A1 | 10/2012 | Gray et al. |
| 2013/0048090 | A1 | 2/2013 | Yang |
| 2013/0062422 | A1 | 3/2013 | Marty et al. |
| 2013/0146160 | A1 * | 6/2013 | Davidson ............... F17D 3/00 137/551 |
| 2013/0239321 | A1 | 9/2013 | Reeder et al. |
| 2013/0293559 | A1 | 11/2013 | Liu |
| 2013/0340162 | A1 | 12/2013 | Peel |
| 2013/0340839 | A1 | 12/2013 | Peel |

FOREIGN PATENT DOCUMENTS

| | | |
|---|---|---|
| DE | 202011050902 | 1/2011 |
| DE | 102009052084 | 3/2011 |
| DE | 102009051789 | 5/2011 |
| EP | 0035892 | 9/1981 |
| EP | 1662056 | 5/2006 |
| GB | 2424367 | 9/2006 |
| WO | WO99/57381 | 11/1999 |
| WO | WO2004/081300 | 9/2004 |
| WO | WO2008/091665 | 7/2008 |
| WO | WO2008/103330 | 8/2008 |
| WO | WO2012/030200 | 3/2012 |

OTHER PUBLICATIONS

Touch Sensing Technology and Its Application Based on Caosense (English translation); 13 pages.
Chinese Office Action issued in corresponding Application No. 201510194532.8 dated Mar. 29, 2017 with English translation.
European Search Report for Application No. 15164665.0 dated Sep. 4, 2015, 7 pages.
European Search Report for Application No. 15164670.1 dated Sep. 8, 2015, 8 pages.

* cited by examiner

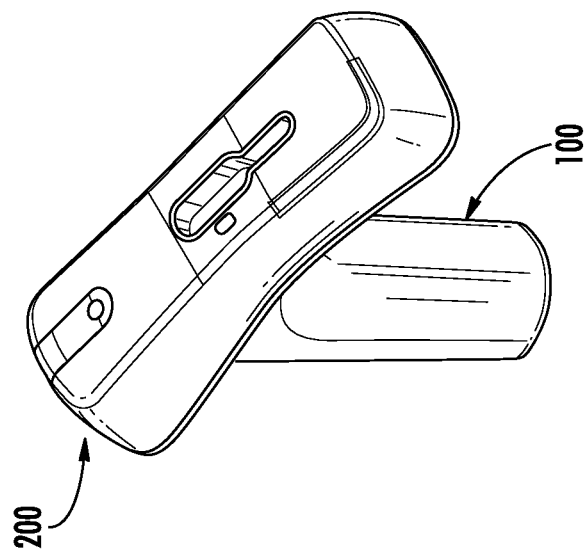
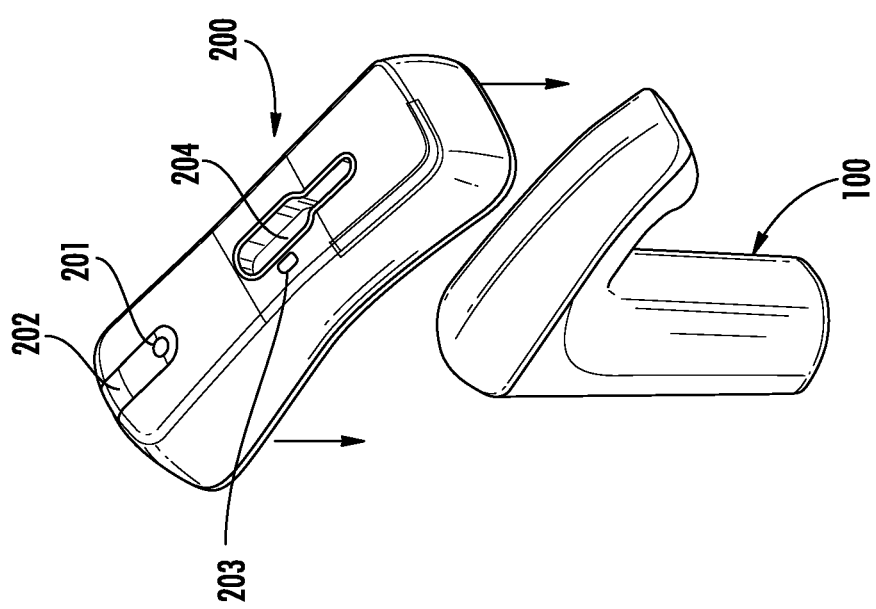
FIG. 8B
FIG. 8A

APPARATUS AND CONTROL SYSTEM FOR MULTI-GESTURAL CONTROL OF WATER DELIVERY DEVICES

CROSS-REFERENCE TO RELATED PATENT APPLICATIONS

This application is a Continuation of U.S. patent application Ser. No. 14/693,447, filed Apr. 22, 2015, which claims the benefit of and priority to U.S. Provisional Application No. 61/982,999, filed Apr. 23, 2014. The entire disclosures of the foregoing applications are hereby incorporated by reference herein.

BACKGROUND

The present application relates generally to water delivery devices, such as faucets, showerheads, and the like. More specifically, the present application relates to electronically controlled water delivery devices that provide for multi-gestural control of water temperature and for programmability of various features associated with the devices at the end user or installer level.

Generally speaking, traditional electronically controlled water delivery devices, such as faucets and showerheads, have limitations. For instance, many electronically controlled water delivery devices are limited in terms of which functions can be controlled and whether those functions are programmable/adjustable at the end user or installer level. In terms of the functions that can be controlled, many electronically controlled water delivery devices are limited to controlling on/off functionality. For example, some traditional faucets include an infrared (IR) sensor that is operatively (e.g., electrically) connected to a control valve for controlling a flow of water from the faucet. Typically, the sensor is configured to detect the presence of a user's hand or other body part, such that when the user's hand is detected, a control valve can be operated to allow a flow of water from a water source to reach the user. However, characteristics such as water flow rate and water temperature are typically set using manual controls or are preset and cannot be adjusted by a user in a hands-free manner after the water is turned on. Thus, when a user activates a traditional electronically controlled water delivery device, the user must manually adjust the temperature and/or flow rate using faucet handles or the like, thus negating at least some of the benefits of a hands-free system, such as maintaining a sanitary environment.

The control of traditional electronically controlled water delivery devices is also limited to specific human gestures/movements to perform certain functions (e.g., either touch or touchless controls for controlling water temperature or flow rate). For example, infrared proximity sensors can only be activated by sensing the presence of a user's body part (e.g., a user's hand, etc.) within a specific detection zone surrounding the sensor. Thus, if a user directly contacts the sensor or waves their hand at a distance outside of the zone of detection of the sensor, then the sensor will not be activated. This is undesirable, because the zone of detection of most sensors is difficult to determine. Furthermore, determining what gestures are required to activate those sensors is not intuitive. Ultimately, this can be frustrating for an end user who is attempting to use a traditional electronically controlled water delivery device and can result in user errors.

In terms of limitations related to programmability of water delivery devices, most electronically controlled water delivery devices include a control system configured to control certain functions of the device (e.g., on/off functionality, etc.). However, most traditional devices do not include programming capabilities at the end user or installer level. For example, parameters such as water temperature set points, valve configuration, water flow rate, and disinfection/cleaning schedules for the device are preset and are not adjustable by an end user or an installer. Furthermore, usage information such as frequency of use and amount of water used in a given time period is unavailable for most devices. This is limiting in that an end user or an installer is unable to tailor the device or multiple devices in a network to meet the needs of a particular user or multiple users. Additionally, an end user or an installer is unable to verify correct operation of the device or multiple devices, or analyze data associated with those devices to determine future trends and/or future costs associated with water usage.

Thus, there is a need for improvements to electronically controlled water delivery devices, and in particular, to the controls and control systems of such devices that allow for increased functionality, multi-gestural control of water temperature, and programmability of various features associated with the devices at the end user/installer level. These and other advantageous features will become apparent to those reviewing the present disclosure.

SUMMARY

One embodiment of the present application relates to a water delivery device. A water delivery device includes a body, a user interface, a micro-mixing valve, first and second capacitive sensors, and a controller. The body includes a base and a spout. The user interface is provided on the spout. The micro-mixing valve is contained within the body and is in fluid communication with a hot water source and a cold water source. The first capacitive sensor is provided below the user interface. The second capacitive sensor is provided below the user interface and is spaced apart from the first capacitive sensor. The controller is operatively connected to the first capacitive sensor, the second capacitive sensor, and the micro-mixing valve. Each of the first and second capacitive sensors is configured to be independently activated by a user to transmit a signal to the controller to increase or decrease a temperature of a flow of water flowing from the micro-mixing valve.

Another embodiment relates to a faucet assembly. The faucet assembly includes a body, a user interface, an electronically controlled micro-mixing valve, first and second capacitive sensors, and a controller. The body includes a base and a spout. The spout extends outwardly from the base. The user interface is provided on the spout. The electronically controlled micro-mixing valve is in fluid communication with a hot water source and a cold water source. The first capacitive sensor is provided below the user interface on the spout and is configured to increase a temperature of a flow of water flowing from the electronically controlled micro-mixing valve. The second capacitive sensor is provided below the user interface on the spout and is configured to decrease the temperature of the flow of water flowing from the electronically controlled micro-mixing valve. The controller is operatively connected to the first capacitive sensor, the second capacitive sensor, and the electronically controlled micro-mixing valve. The controller is configured to receive a signal from the first or the second capacitive sensor and to transmit a corresponding signal to the electronically controlled micro-mixing valve to independently control a flow of water from the hot water source and the cold water source so as to increase or decrease the temperature of the flow of water flowing from the electronically controlled micro-mixing valve. Each of the electronically controlled micro-mixing valve and the controller is disposed within the body of the faucet assembly.

Another embodiment relates to a water delivery device. The water delivery device includes a body, a micro-mixing valve, first and second capacitive sensors, and a controller. The micro-mixing valve is disposed within the body and is in fluid communication with a hot water source and a cold water source. The first capacitive sensor is provided within the body and is associated with a water temperature increase. The second capacitive sensor is provided within the body, spaced apart from the first capacitive sensor, and is associated with a water temperature decrease. The controller is disposed within the body and is operatively connected to the micro-mixing valve, the first capacitive sensor, and the second capacitive sensor. Each of the first and second capacitive sensors is configured to be independently activated by a user to control a flow of water from the hot and the cold water sources to adjust a temperature of a flow of water flowing from the micro-mixing valve.

Another embodiment relates to a control system for a water delivery device. The control system includes a water delivery device including a mixing valve, a controller configured to control the mixing valve, and a first optical communications interface coupled to the controller. The control system further includes a communications bridge including a second optical communications interface and a separate data communications interface. The communications bridge is configured to exchange information with the water delivery device using optical communications via the first and second optical communications interfaces, and to exchange information with a user device using electronic data communications between the user via and the data communications interface.

Another embodiment relates to a control system for a network of water delivery devices distributed throughout a facility. The control system includes a plurality of mixing valves. Each of mixing valves is fluidly connected to a discrete set of the water delivery devices and configured to affect an attribute of water output by the fluidly connected water delivery devices. Each of the discrete sets of water delivery devices is located in a different room of a facility. The control system further includes a controller for the plurality of mixing valves The controller is configured to establish a communications link between the controller and a user device, receive configuration information from a user device via the communications link, generate control signals for the plurality of mixing valves based on the configuration information, and provide the control signals to the plurality of mixing valves. The control signals cause the plurality of mixing valves to controllably adjust the attribute of the water output by the fluidly connected water delivery devices.

Another embodiment relates to a control system for a network of water delivery devices. The control system includes a plurality of mixing valves. Each of mixing valves is fluidly connected to a discrete set of the water delivery devices and configured to affect an attribute of water output by the fluidly connected water delivery devices. The control system further includes a controller for the plurality of mixing valves. The controller is configured to establish a communications link between the controller and a remote system via a communications network, receive update data from the remote system via the communications link, use the update data to update configuration settings stored within the controller, generate control signals for the plurality of mixing valves using the updated configuration settings, and provide the control signals to the plurality of mixing valves. The control signals cause the plurality of mixing valves to controllably adjust the attribute of the water output by the fluidly connected water delivery devices.

BRIEF DESCRIPTION OF THE DRAWINGS

FIG. 8A is a perspective view of a faucet assembly and a communication bridge shown in an uninstalled position, according to an exemplary embodiment.

FIG. 8B is a perspective view of the communication bridge and the faucet assembly of FIG. 8A shown in an installed position, according to an exemplary embodiment.

DETAILED DESCRIPTION

Figure 1:
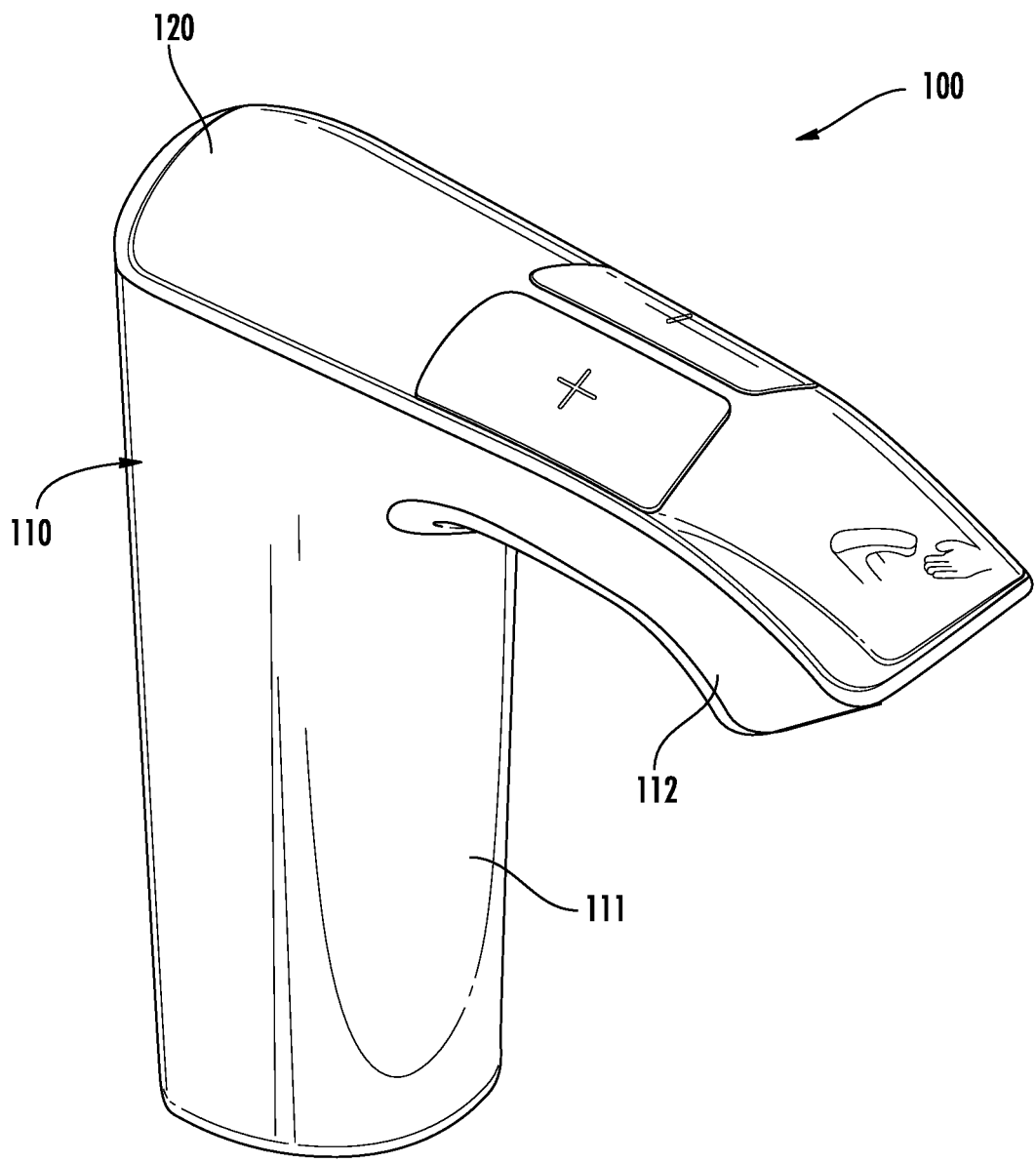
FIG. 1 is a perspective view of a faucet according to an exemplary embodiment.

Referring generally to the FIGURES, disclosed herein are water delivery devices that allow for the multi-gestural control of water temperature, allow for the selective programming of various features associated with the devices at the end user or installer level (e.g., water temperature set-points, cleaning schedules, etc.), and allow for the selective retrieval of various data associated with the water delivery device(s) (e.g., errors/service history, water usage, etc.). In this manner, the water delivery devices provide for a more sanitary environment for end users by reducing the likelihood for cross-contamination and by complying with hand care protocols, while also providing for a more enjoyable user experience. In addition, the water delivery devices disclosed herein provide for improvements in customization, maintenance, and data analysis of such devices.

According to an exemplary embodiment, the water delivery devices disclosed herein allow for improved control of water temperature by including multi-gestural controls. For example, the water delivery devices are configured to allow a user to independently control hot and cold water sources to thereby adjust the outlet water temperature of the device by performing different human gestures, including both touch and touchless human gestures. In various exemplary embodiments, the devices are configured such that a user can perform a human gesture at or near a sensor (e.g., a capacitive sensor, etc.) associated with a hot and a cold water source, such as momentary, repeated, or continuous physical contact with an outer surface of the device above the sensor or with a zone of detection associated with the sensor above the outer surface of the device. In this way, the water delivery devices provide for improved functionality and for a more intuitive, enjoyable end user experience, while still maintaining a sanitary environment. Furthermore, the multi-gestural controls prevent the need to touch the water delivery device to reduce the risk of cross-infection and to comply with hand care protocols in, for example, a hospital setting.

According to another exemplary embodiment, the water delivery devices allow for selective programming of various features of the devices and the selective retrieval of various data associated with the devices. For example, the water delivery devices are configured to manually receive a communication bridge to allow for communication between a portable communication device (e.g., a smart phone, laptop, tablet, etc.) and the water delivery device. A programmable software application can be accessed from the portable communication device that can enable a user or an installer to selectively program various features of the water delivery device, such as water valve configuration, network configuration (with multiple water delivery devices), thermal disinfection schedules, cold water flush cycles, water outlet configuration, duty flush cycles, electronic thermal disinfection schedules, and the like. Additionally, the software application can allow a user or an installer to selectively retrieve data from the water delivery device, such as water usage information and an error/failure log to verify correct operation and to track maintenance issues for future reference and analysis by an end user or an installer. In this way, the water delivery devices allow for a user or an installer to adapt the device or multiple devices to suit a particular user's needs or a group of users' needs. In addition, the devices allow for monitoring and analysis of data associated with the devices to verify correct operation, determine optimized maintenance schedules, and predict future water usage and associated costs.

Throughout this disclosure, several examples of water delivery devices are provided to illustrate various features of the present application. The water delivery devices are described primarily as faucet assemblies, shower outlets, and the valves associated therewith. However, it should be understood that the present application is applicable to any of a variety of water delivery devices in addition to the specific examples described in detail herein. For example, the present application can be used in conjunction with faucets, shower outlets, bath tub taps, hot tubs, sprinkler systems, water fountains, irrigation systems, washing machines, dishwashers, water dispensers in a refrigerator or freezer, ice makers, water cooling systems (e.g., for electronic hardware, machinery, and the like), and/or any other system or device that consumes, uses, or dispenses water from a water source during operation.

Figure 1A:
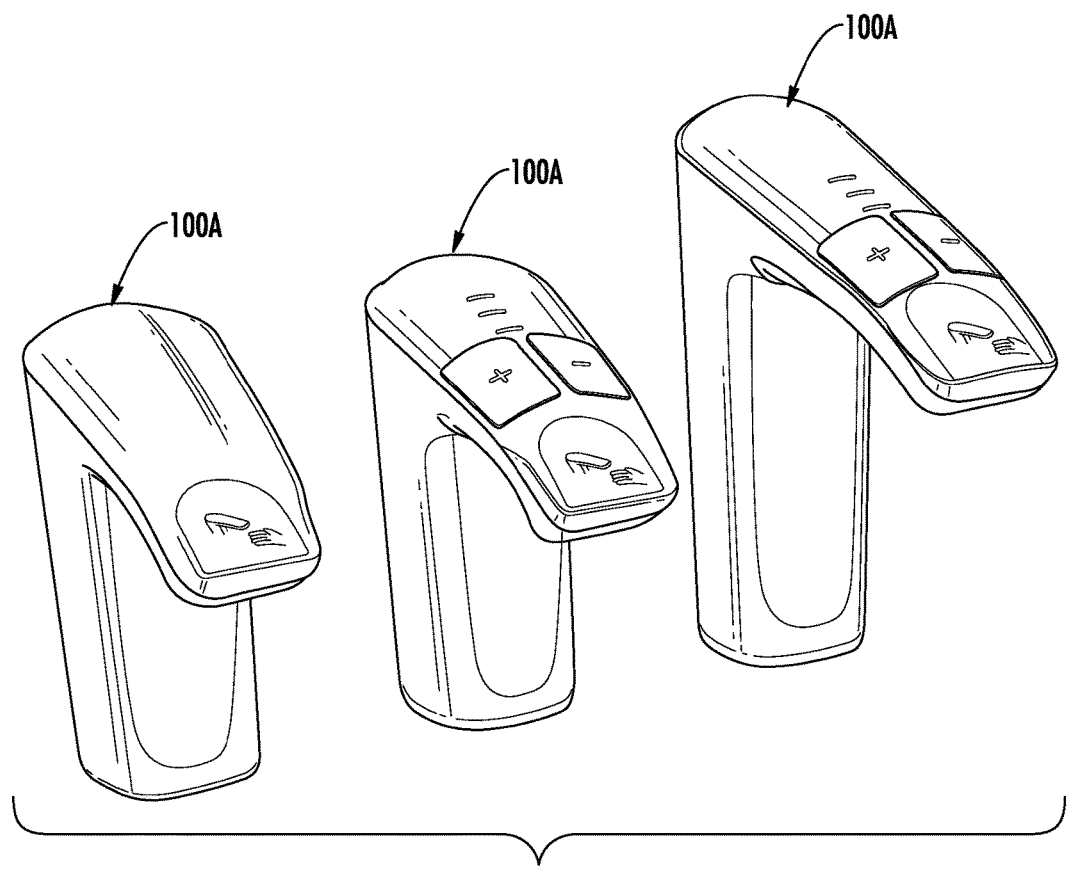
FIG. 1A is a perspective view of various deck-mounted faucets according to various exemplary embodiments.
Figure 1B:
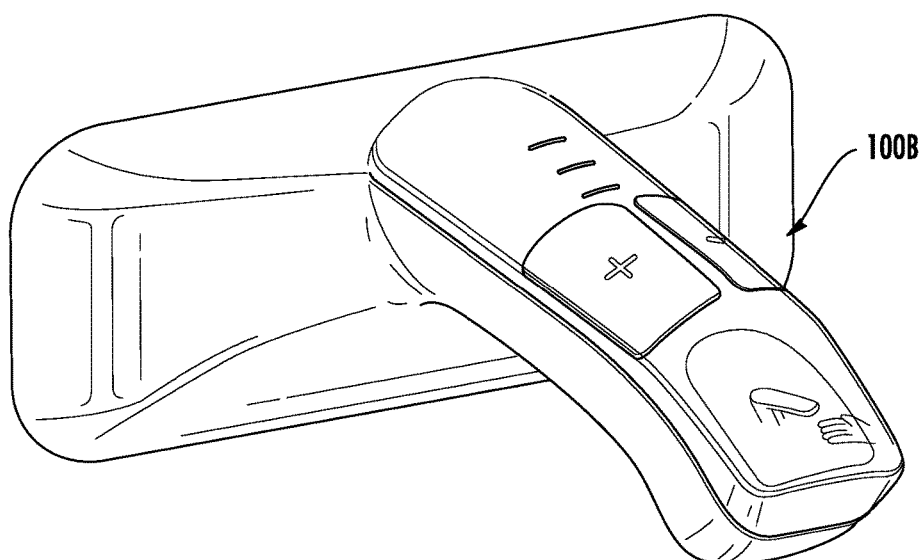
FIG. 1B is a perspective view of a wall-mounted tap according to an exemplary embodiment.
Figure 3:
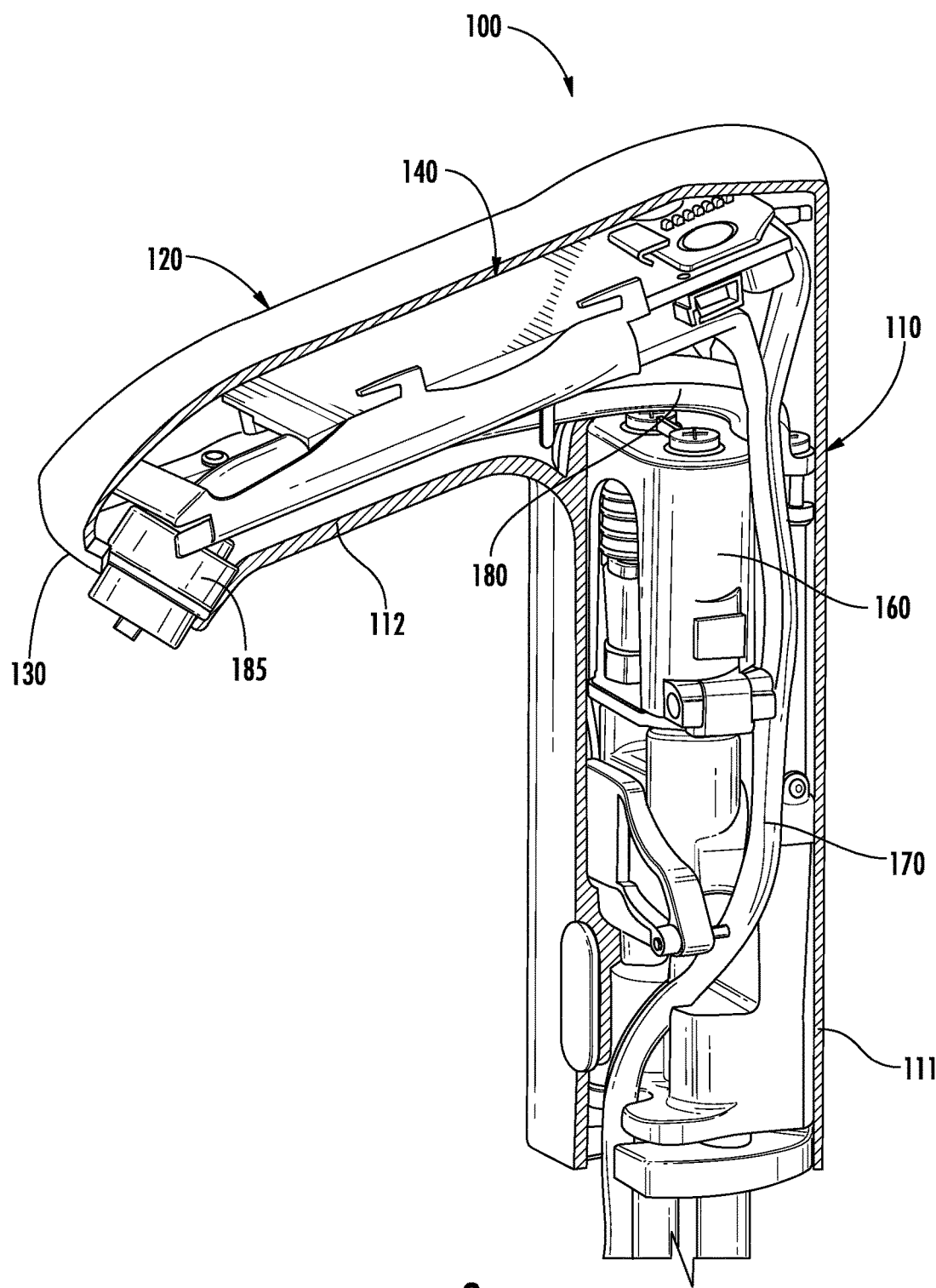
FIG. 3 is a cutaway perspective view of the faucet assembly of FIG. 1 according to an exemplary embodiment.
Figure 4:
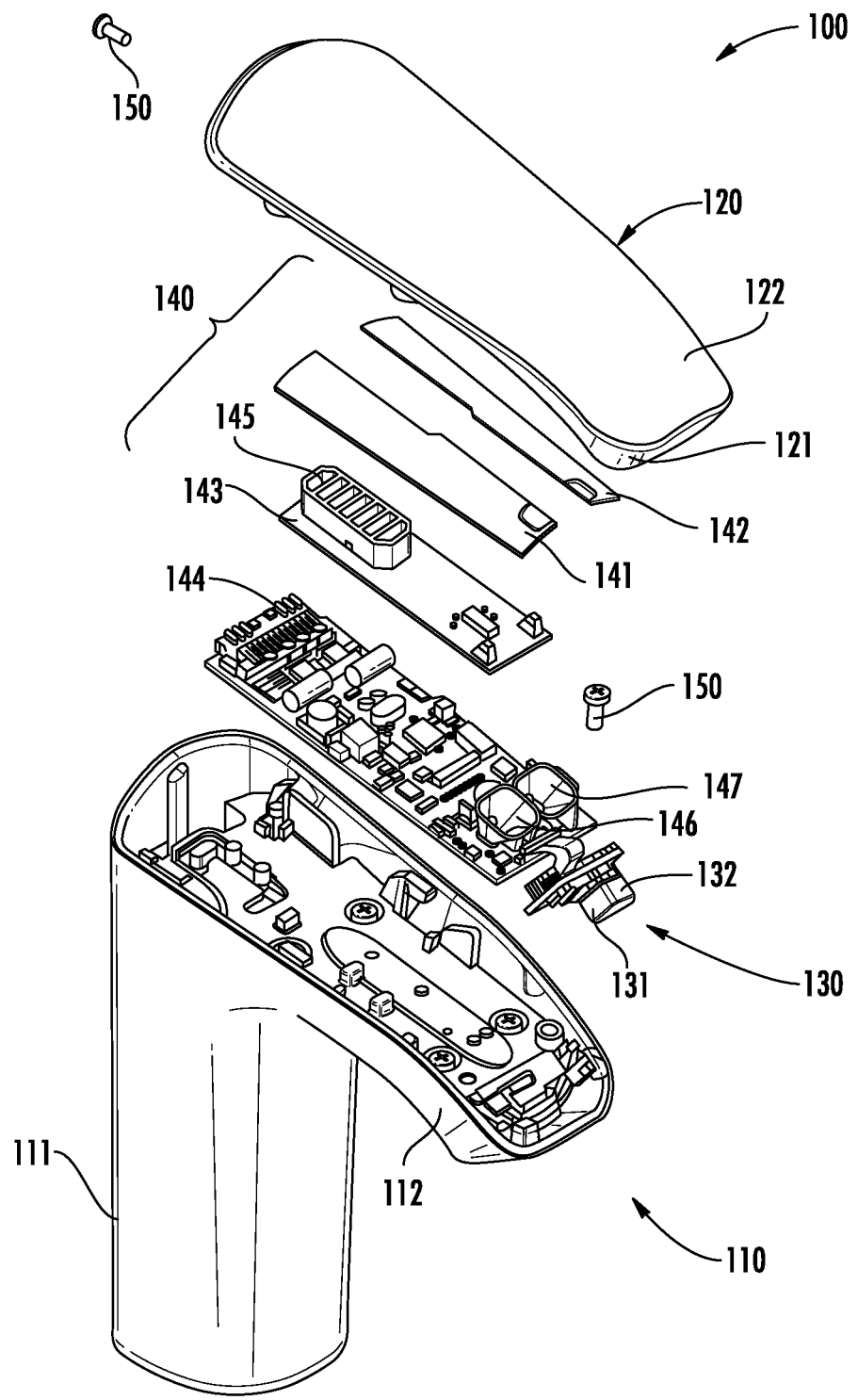
FIG. 4 is an exploded view of the faucet assembly of FIG. 1 according to an exemplary embodiment.

Referring now to FIGS. 1 and 3-4, a water delivery device is shown as a faucet assembly 100 according to an exemplary embodiment. As shown in FIG. 1, the faucet assembly 100 includes a body 110 having a base 111 and a spout 112 extending outwardly from an upper portion of the base 111. The faucet assembly 100 is configured to be coupled to a countertop, a basin, a fixed portion of a building (e.g., a wall, etc.), or other similar fixed structure (not shown) via the base 111. According to an exemplary embodiment shown in FIG. 1A, the water delivery device can be a faucet 100A including a base configured for deck-mounting (e.g., mounting adjacent a basin, a countertop, etc.). As shown in FIG. 1A, the faucet 100A can have a different height base, according to various exemplary embodiments. According to another exemplary embodiment shown in FIG. 1B, the water delivery device is a tap 100B including a base configured for wall-mounting.

According to an exemplary embodiment, the body 110 is a molded structure made from a rigid or a semi-rigid material or combinations of materials, such as plastic, metal, or the like. The body 110 is constructed so as to minimize the number of crevices or seams to prevent contamination and buildup of bacteria on/in the assembly. For example, as shown in FIG. 1, a lower portion of the spout 112 and the base 111 are formed (e.g., molded, etc.) integrally as a single structure. In this way, the faucet assembly 100 is well suited for applications where cleanliness and sterilization are important, such as in a hospital setting. According to various exemplary embodiments, the body 110 may include a variety of different surface finishes/treatments or combinations of surface finishes, such as plating (e.g., chrome PVD plating, etc.), paint, coatings (e.g., clear coating, etc.), or other similar types of surface treatments.

As shown in FIGS. 1 and 3-4, the faucet assembly 100 includes a user interface 120 provided on or coupled to an upper portion of the spout 112. The faucet assembly 100 includes only one continuous seam where the user interface 120 engages the body 110. This design configuration, advantageously, helps to minimize the accumulation of bacteria and helps to facilitate cleaning of the assembly by a user or an installer. According to an exemplary embodiment, the user interface 120 is removable from the spout 112 to allow for maintenance or repair of the faucet assembly 100 (see, for example, FIG. 4). The user interface 120 is configured to provide a visual indication to a user or an installer of various functions of the faucet assembly 100, including water temperature controls, on/off function, outlet water temperature indication, and other functions which are discussed in greater detail below. The user interface 120 is also configured to allow a user to selectively adjust an outlet water temperature by either touch or touchless (i.e., hands-free) controls. For example, a user can physically contact an outer surface of the user interface 120, at respective hot and cold water controls to independently control hot and cold water sources, to thereby adjust the outlet water temperature. Alternatively, a user can adjust the outlet water temperature by independently contacting a zone of detection located within an area above each of the hot and cold water temperature controls on the user interface 120. The zones of detection correspond to respective capacitive sensors (i.e., first and second capacitive sensors 141 and 142 shown in FIG. 4) provided below or coupled to a lower portion of the user interface 120, the function and structure of which is discussed in further detail below.

Figure 2:
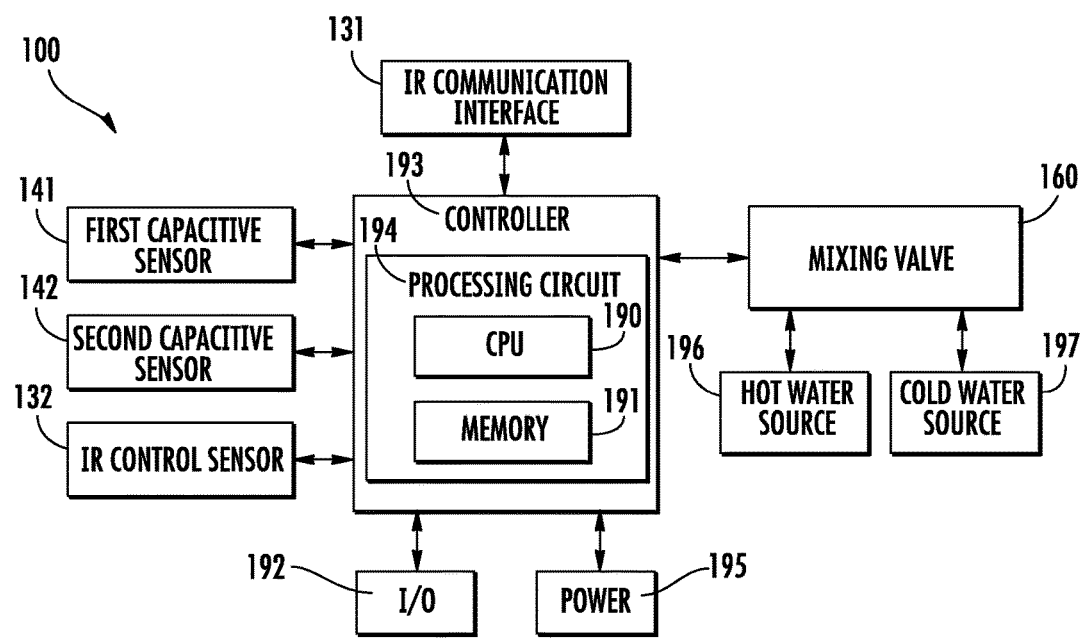
FIG. 2 is a schematic illustration of a control system for a water delivery device according to an exemplary embodiment.

Referring now to FIG. 2, the faucet assembly 100 includes an electronic control system shown as a controller 193. The controller 193 is shown to include a processing circuit 194 having a central processing unit (CPU) 190 and a memory 191, according to an exemplary embodiment. According to an exemplary embodiment, the CPU 190 is a micro-control unit (MCU). In other embodiments, the CPU 190 can be implemented as a general purpose processor, an application specific integrated circuit (ASIC), one or more field programmable gate arrays (FPGAs), a group of processing components, or other suitable electronic processing components. The memory 191 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory 191 may be or include volatile memory or non-volatile memory, and may include database components, object code components, script components, or any other type of information structure for supporting the various activities and information structures described in the present application. According to an exemplary embodiment, the memory 191 is communicably connected to the CPU 190 via the processing circuit 194 and includes computer code for executing (e.g., by the processing circuit 194 and/or the CPU 190) one or more processes described herein. In some embodiments, the memory 191 is configured to store/log various data associated with the faucet assembly 100, such as errors/service history, water usage history, cleaning schedules, and the like.

The controller 193 is operatively connected to a first capacitive sensor 141, a second capacitive sensor 142, an IR communication interface 131, and an IR control sensor 132. An input/output (I/O) port 192 is configured to provide visual indications (e.g., LED backlighting, etc.) of various functions of the faucet assembly 100, such as water temperature, programming/service functions, on/off function, and the like. The controller 193 is also operatively connected to a fluid control valve shown schematically as a mixing valve 160.

According to an exemplary embodiment, the mixing valve 160 is a micro-mixing valve that is electronically controlled. As shown in FIG. 2, the mixing valve 160 is in fluidic communication with both a hot water source 196 and a cold water source 197. The mixing valve 160 is configured to receive signals from the first and second capacitive sensors 141 and 142 via the controller 193 to selectively and independently control a flow of water from the hot and cold water sources 196 and 197. According to an exemplary embodiment, the first capacitive sensor 141 is associated with a water temperature increase (i.e., hot and cold water sources 196 and 197) and the second capacitive sensor 142 is associated with a water temperature decrease (i.e., hot and cold water sources 196 and 197). In this way, the control system allows for the independent control of hot and cold water sources to enable the selective control of an outlet water temperature for the faucet assembly 100.

Still referring to FIG. 2, the IR control sensor 132 is configured to control the on/off functionality of the mixing valve 160 by, for example, detecting the proximity of a user's body part(s) (e.g., a hand, a finger, etc.). The IR control sensor 132 is in electronic communication with the mixing valve 160 and can be activated/controlled by detecting the presence of a user's hand (or other body part(s)). For example, if a user wishes to turn on a flow of water from the faucet assembly 100, the user can approach a zone of detection associated with the IR control sensor 132 located near the faucet assembly 100, such as near the spout 112, according to an exemplary embodiment (see FIG. 4). The user can perform a hand gesture within the zone of detection associated with the IR control sensor 132 to turn on a flow of water. The IR control sensor 132 will transmit a signal to the controller 193 which will instruct the mixing valve 160 to provide a flow of water to the user by transmitting a corresponding signal to the mixing valve 160. According to an exemplary embodiment, the controller 193 may be programmed to provide a flow of water at a default flow rate, which can be selectively adjusted/programmed by a user or an installer. The controller 193 is further configured to maintain the default or programmed water flow rate during water temperature adjustments by a user.

The IR communication interface 131 is configured to communicate with a communication bridge 200 (shown in FIGS. 9A-9B) that may be removably coupled to the faucet assembly 100 to allow for servicing or programming of various features of the faucet assembly 100 and/or for retrieving data from the faucet assembly 100. According to an exemplary embodiment, the communication bridge 200 is configured to allow a user or an installer to communicate with the faucet assembly 100 using a portable communication device (e.g., a laptop, a smartphone, a tablet, etc.) via a wireless communication protocol, such as a Bluetooth communication protocol. The user or the installer can access a software application on a portable communication device to selectively program or service the faucet assembly 100 and/or to retrieve data stored within the memory 191 of the faucet assembly 100. The details of the various programmable features and data retrieval aspects of the faucet assembly 100 are discussed in further detail below.

Referring now to FIG. 3, the faucet assembly 100 of FIG. 1 is shown in a partial perspective view. As shown in FIG. 3, the mixing valve 160 has a size and configuration that allows it to be disposed within the base 111 of the body 110, according to an exemplary embodiment. The mixing valve 160 can have a micro size to facilitate coupling within the base 111 of the body 110 so as to form a single faucet assembly unit. In this way, the faucet assembly 100 minimizes assembly issues and provides for improvements in packaging various water delivery system components (e.g., valves, fluid conduits, electronics, etc.). According to other exemplary embodiments (not shown), the mixing valve 160 is located remotely from the faucet assembly 100, such as in a separate housing or structure located adjacent to the faucet assembly 100 (e.g., a cabinet, a wall, etc.).

According to the exemplary embodiment shown in FIG. 3, the mixing valve 160 is a micro-mixing valve similar to the mixing valve disclosed in U.S. patent application Ser. No. 13/797,263 filed on Mar. 12, 2013, the entire disclosure of which is incorporated by reference herein and details of which are discussed in further detail below. The mixing valve 160 is in fluidic communication with a fluid conduit 180. The fluid conduit 180 is configured to direct a flow of water from the mixing valve 160 to an outlet 185 located at a distal end of the spout 112. According to an exemplary embodiment, the fluid conduit 180 is made from a material that is capable of reducing biofilm accumulation, such as copper. In this way, the fluid conduit 180 can advantageously provide for a more sanitary waterway within the faucet assembly 100.

According to an exemplary embodiment, the outlet 185 is configured to shape a flow of water exiting the faucet assembly 100 so as to eliminate the need for a flow straightener, as is typically required in most traditional faucet assemblies. For example, in many faucet assemblies, a flow straightener such as a plastic mesh is used to shape and direct a flow of water to a user. However, most flow straighteners are prone to accumulation of bacteria due to their structure, which typically includes multiple openings, and due to their material, which is typically a polymeric material. In contrast, the outlet 185 is formed from a material suitable to minimize the amount of bio-film accumulation therein, such as brass. In addition, the outlet 185 does not include a mesh structure and therefore, minimizes the likelihood of bacteria accumulation. The outlet 185 includes one central opening and is coupled directly to an end of the fluid conduit 180. According to other exemplary embodiments, the faucet assembly 100 is configured to use a traditional flow straightener coupled to the fluid conduit 180.

Still referring to FIG. 3, the faucet assembly 100 also includes one or more circuit boards positioned within the spout 112 (shown in detail in FIG. 4) and one or more electrical cables 170 routed therein. The circuit board(s) and the electrical cable(s) 170 are configured to allow for electronic control of various functions of the faucet assembly 100, such as water temperature, water flow rate, faucet disinfection, faucet programming, and data retrieval, among other functions. According to an exemplary embodiment, one or more electrical cables 170 operatively connect the mixing valve 160 to a capacitive sensing module 140, to allow for the selective and independent control of hot and cold water sources 196 and 197. According to another exemplary embodiment (not shown), the one or more electrical cables 170 can be routed to connect additional faucet assemblies 100 and/or water delivery devices located within, for example, a building to form a network of a plurality of water delivery devices. According to an exemplary embodiment, the network may include one or more showerheads, faucet assemblies, or other electronically controlled water delivery devices.

Referring now to FIG. 4, which illustrates an exploded view of the faucet assembly of FIGS. 1 and 3, the user interface 120 includes a base shown as a panel member 121 and a graphics layer shown as a film 122. According to an exemplary embodiment, the panel member 121 is molded from a plastic, such as a black PET resin including a glass filler (e.g., 30% glass filled, etc.). According to an exemplary embodiment, the film 122 is a screen printed structure that is sandwiched between the panel member 121 and a substantially transparent, outer plastic layer. In one exemplary embodiment, the outer plastic layer is overmolded onto the panel member 121 with the film 122 disposed therebetween. According to an exemplary embodiment, the film 122 is made from a PC/PMMA plastic blend and includes screen printed graphics/icons printed thereon. The outer plastic layer is made from a robust, substantially transparent plastic (e.g., a PEN/PET resin, etc.) sufficient to protect the graphics/icons on the film 122 from being damaged or warn out by, for example, a user's physical touch, fluids (e.g., soap, water, etc.), or other environmental contaminants. Both the film 122 (or portions thereof) and the outer plastic layer are sufficiently light transmissive to allow light (e.g., LED light, etc.) to pass through from behind the user interface 120 to provide visual feedback of various functions of the faucet assembly 100 to a user or an installer. According to an exemplary embodiment, the user interface 120 further includes a UV spray-on hard coat disposed over the outer plastic layer to provide additional surface protection of the user interface 120. According to other exemplary embodiments, the panel member 121, the film 122, and/or the outer layer may be made from other rigid or semi-rigid materials or combinations of materials.

As shown in FIG. 2, the user interface 120 is positioned over the capacitive sensing module 140 and is further configured to allow a user to control the temperature of a flow of water from the faucet assembly 100 using both "touch" and "touchless" human gestures. As used herein, the term "touch" human gestures refers to human physical contact with a component, such as with an outer surface of the user interface 120 above the first or second capacitive sensors 141 and 142, such that either sensor will detect a change in a capacitance value. In contrast, the term "touchless" human gestures refers to human contact with a zone of detection, such as may be associated with either the first or second capacitive sensors 141 and 142 located above the user interface 120, such that either sensor will detect a change in a capacitance value.

Still referring to FIG. 4, the capacitive sensing module 140 is coupled within the spout 112 directly below the user interface 120. As shown in FIG. 4, the capacitive sensing module 140 includes a first capacitive sensor 141, which is associated with a hot and/or a cold water source 196 and 197, and a second capacitive sensor 142, which is also associated with a hot and/or a cold water source 196 and 197. According to the exemplary embodiment of FIG. 4, each of the first and second capacitive sensors 141 and 142 is a sensor pad configured to engage corresponding electrical contacts located on a first circuit board 143. Each of the sensor pads is coupled directly to a rear portion of the user interface 120 (i.e., a rear inner surface of the panel member 121). According to an exemplary embodiment, each of the sensor pads is adhered to the rear inner surface of the panel member 121 using an adhesive. Each of the sensor pads is configured to engage respective electrical contacts located on the first circuit board 143 to form an electrical connection. According to an exemplary embodiment, each of the first and second capacitive sensors 141 and 142 is operatively connected to the controller 193 (shown schematically in FIG. 2), which forms part of the first circuit board 143 and/or a second circuit board 144, located below the first and second capacitive sensors 141 and 142. As noted above, each of the first and second capacitive sensors 141 and 142 is configured to allow for the independent control of hot and cold water sources 196 and 197 to control an outlet water temperature using both touch and touchless human gestures.

For example, if a user of the faucet assembly 100 desires warmer water, the controller 193 and the first capacitive sensor 141 (associated with the hot water source 196) are configured such that the user can perform different hand gestures at/near the sensor, including momentary, repeated, or continuous physical contact with an outer surface of the user interface (i.e., touch control), or physical presence within a zone of detection above the user interface (i.e., touchless control) to incrementally increase the temperature of a flow of water to the user. Similarly, if a user desires colder water, the controller 193 and the second capacitive sensor 142 (associated with the cold water source 197) are configured such that the user can perform different hand gestures at/near the sensor including momentary, repeated, or continuous physical contact with an outer surface of the user interface (i.e., touch control), or physical presence within a zone of detection above the user interface (i.e., touchless control) to incrementally decrease the temperature of a flow of water to the user. The activated capacitive sensor will transmit a corresponding signal to the controller 193, which is operatively connected to the mixing valve 160 in fluidic communication with the hot and cold water sources 196 and 197. The mixing valve 160 will then control the amount of water received from the hot and/or cold water sources 196 and 197 based on the received signal from the controller 193, to thereby incrementally increase or decrease the temperature of the flow of water to a user. In this way, the temperature of the flow of water to an end user can be selectively and independently controlled using multiple human gestures.

According to an exemplary embodiment, the control system including controller 193 is configured to change/adjust the water temperature at different increments depending on an individual user's needs or multiple users' needs. For example, a signal to adjust the water temperature received from the first or second capacitive sensors 141 and 142 can correspond to an incremental increase or decrease in water temperature of one degree Fahrenheit (1° F.) or more, depending on the desired incremental value. The value of the incremental change in water temperature can be a programmable feature in the control system (i.e., controller 193), which can be adjusted/modified by a user or an installer.

According to the exemplary embodiment shown in FIG. 4, the first and second circuit boards 143 and 144 are each coupled within the body 110 using one or more fasteners shown as screws 150. However, it is appreciated that the first and/or second circuit boards 143 and 144 may be coupled within the body 110 using other types of fasteners or combinations of fasteners, such as snap features, adhesive, or the like, according to other exemplary embodiments (not shown). The capacitive sensing module 140 is operatively connected to the controller 193 and the mixing valve 160 (shown in FIG. 3) via one or more electrical connections such as electrical cables, electrical connectors, circuit board leads, or other types of suitable electrical connections.

As shown in FIG. 4, the first and second circuit boards 143 and 144 each include one or more indicators 145, 146, and 147 (e.g., LED lights, etc.) configured to provide visual feedback to a user or an installer of various functions of the faucet assembly 100. According to an exemplary embodiment, the indicator 145 is an LED array including different colored LEDs (e.g., red and blue LEDs, etc.) configured to indicate a relative outlet water temperature for the faucet assembly 100. The indicator 146 includes one or more LEDs associated with a programmed cycle of the faucet assembly 100 and is configured to indicate that the faucet assembly 100 is undergoing either a programming session or a programmed cycle (e.g., thermal disinfection cycle, duty flush cycle, cold water flush cycle, etc.). The indicator 147 includes one or more LEDs associated with a service function of the faucet assembly 100 and is configured to indicate that the faucet assembly 100 is undergoing a service or is experiencing an operation error. Each of the first and second circuit boards 143 and 144 also includes various electrical components, such as transistors, resistors, capacitors, and the like. The first circuit board 143 is operatively (i.e., electrically) connected to the second circuit board 144 via an electrical connector shown as a multi-pin connector, although it is appreciated that other types of electrical connectors may be used, such as ribbon cables or the like, according to other exemplary embodiments (not shown). According to an exemplary embodiment, the faucet assembly 100 is operatively connected to a power source 195 (shown schematically in FIG. 2), such as a battery, a building power supply, or the electrical grid.

Still referring to FIG. 4, the faucet assembly 100 further includes an infrared sensing module 130 located at a distal end of the spout 112. The infrared sensing module 130 is operatively connected to the second circuit board 144 via an electrical connector shown as a ribbon cable, according to an exemplary embodiment. The infrared sensing module 130 includes an infrared (IR) communication interface 131 and an infrared (IR) control sensor 132 positioned adjacent to each other on the module. The infrared control sensor 132 is configured to control a flow of water from the faucet assembly 100 by detecting the proximity of a user (e.g., by detecting a user's hand or other body part, etc.). The infrared control sensor 132 is operatively connected to the mixing valve 160 via controller 193. The infrared communication interface 131 is configured to communicate with a communications bridge 200 (shown in FIGS. 9A-9B) to allow for remote programming of the faucet assembly 100 and/or remote data retrieval from the faucet assembly 100 by a user or an installer using a portable communication device (e.g., a laptop, a tablet, a smartphone, etc.).

Figure 5:
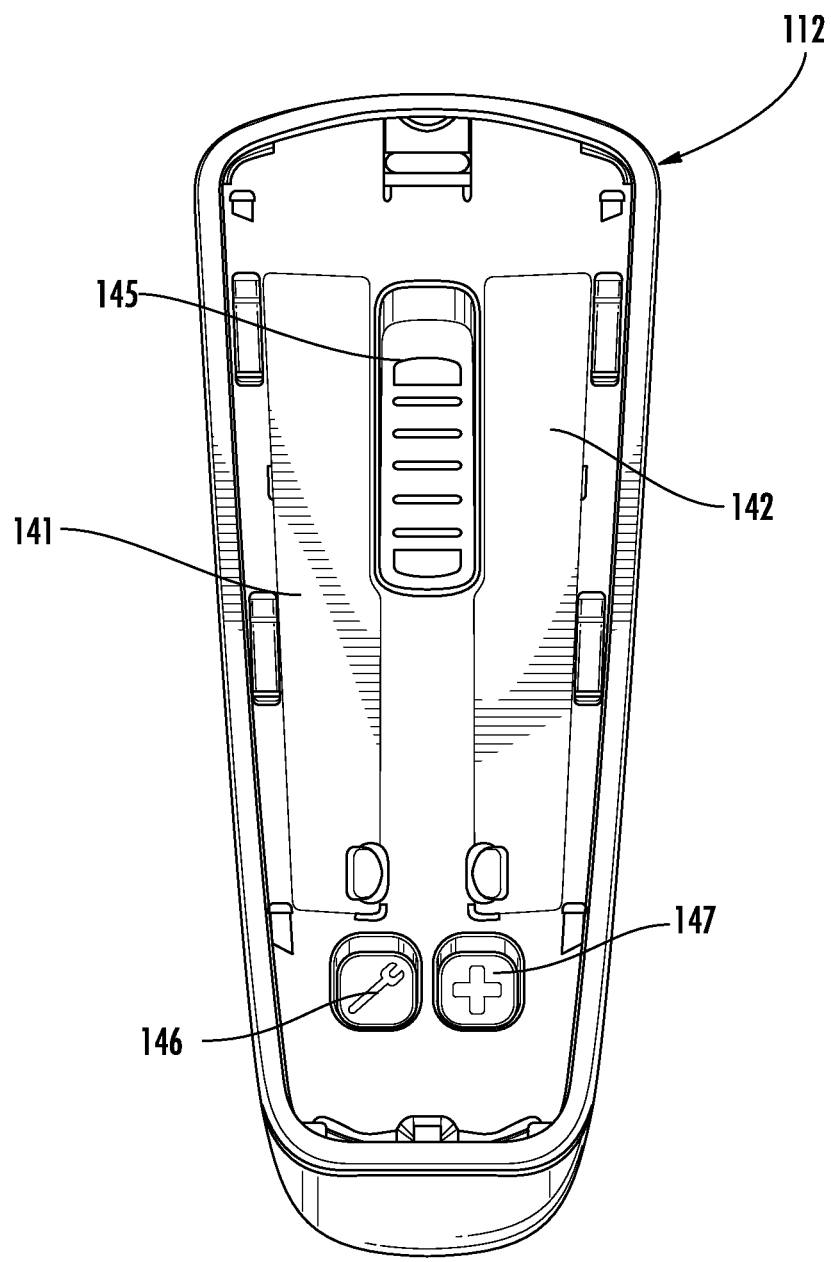
FIG. 5 is a top view of the faucet assembly of FIG. 1 shown without a user interface, according to an exemplary embodiment.

Referring now to FIG. 5, the relative positions of the first and second capacitive sensors 141 and 142 within the faucet assembly 100 are shown according to an exemplary embodiment. As shown in FIG. 5, the first and second capacitive sensors 141 and 142 are positioned laterally adjacent to each other at a first distance of about 0.477 inches (12.12 millimeters) along a first portion of each sensor located nearest the distal end of the spout 112, and at a second distance of about 0.594 inches (15.1 millimeters) along a second portion of each sensor located farthest from the distal end of the spout 112. Each of the first and second capacitive sensors 141 and 142 has an arcuate/curved shape extending laterally along the entire length of each sensor (see FIG. 4). Each sensor 141 and 142 has an overall length of about 3.36 inches (85.29 millimeters). According to other exemplary embodiments (not shown), each of the first and second capacitive sensors 141 and 142 can have a generally flat configuration. According to other exemplary embodiments, the first and second capacitive sensors 141 and 142 can have different dimensions and/or relative spacing within the faucet assembly 100. According to the exemplary embodiment of FIG. 5, each of the first and second capacitive sensors 141 and 142 are sensor pads configured to be coupled to a rear inner surface of the panel member 121 (shown in FIG. 4), and to engage respective electrical contacts on the first circuit board 143 within the faucet assembly 100. The first and second capacitive sensors 141 and 142 each has a shape or outer contour that is substantially the same as an outer surface contour of the user interface 120, so as to enable error free activation of each sensor (i.e., sufficient detection of a change in a capacitance value).

According to an exemplary embodiment, each of the first and second capacitive sensors 141 and 142 has a zone of detection that at least partially surrounds each sensor for detecting a change in capacitance. According to an exemplary embodiment, each of the respective zones of detection extend above an outer surface of the user interface 120 a distance of about 1.5 inches (about 35 millimeters) to about 2 inches (about 50 millimeters). For example, if a user waves/swipes their hand above both of the first and second capacitive sensors 141 and 142, outside of each of the respective zones of detection, neither sensor will detect a change in capacitance and thus, the outlet water temperature will not be adjusted.

According to an exemplary embodiment, each of the first and second capacitive sensors 141 and 142 is a mutual-capacitive sensor configured to allow for multi-touch operation using multiple fingers, hands, or the like to control/activate the sensor. According to other exemplary embodiments, each of the first and second capacitive sensors 141 and 142 is a self-capacitive sensor configured to sense the capacitive load of a single finger or a hand to control/activate the sensor.

According to various exemplary embodiments, each of the first and second capacitive sensors 141 and 142 is configured such that a user can activate each sensor to control the outlet water temperature using multiple human gestures (i.e., multi-gestural control), including both touch and touchless controls. In particular, the faucet assembly is configured such that a user can activate either of the first or second capacitive sensors 141 and 142 using momentary, repeated, or continuous physical contact with either the user interface 120 or physical presence within a zone of detection associated with the sensor located above the user interface 120. In this way, the faucet assembly 100 provides for increased functionality and for a more intuitive, enjoyable end user experience.

According to an exemplary embodiment, a user can activate either the first or second capacitive sensors 141 or 142 by momentarily contacting either the user interface 120 or by momentarily placing a hand/finger within a zone of detection associated with the respective sensor above the user interface 120. A user can momentarily (e.g., 1-2 seconds, etc.) place their hand or a portion thereof directly on an outer surface of the user interface 120. Alternatively, the user can momentarily wave or place their hand within the zone of detection of the sensor above the user interface 120. Each sensor 141 and 142 is configured to detect the presence of a user's hand as a capacitance change and to then transmit a corresponding signal to the controller 193. For example, if a user momentarily places their hand above or directly on a hot water control icon of the user interface 120 within a zone of detection of the first capacitive sensor 141, the first capacitive sensor 141 will detect a change in capacitance and will transmit a signal to increase the water temperature to controller 193 (i.e., by controlling the hot and/or cold water sources 196 and 197 via the mixing valve 160). Similarly, if a user momentarily places their hand above or directly on a cold water control icon of the user interface 120 within a zone of detection of the second capacitive sensor 142, the second capacitive sensor 142 will detect a change in capacitance and will transmit a signal to decrease the water temperature to controller 193 (i.e., by controlling the hot and/or cold water sources 196 and 197 via the mixing valve 160).

According to another exemplary embodiment, a user can activate either of the first or second capacitive sensors 141 and 142 by repeated physical contact with either the user interface 120 (e.g., by tapping a finger directly on the user interface 120, etc.) or by repeated physical presence within a zone of detection associated with the respective sensor above the user interface 120 (e.g., by repeatedly waving a hand or finger, etc.). For example, each time a user repeatedly places and removes their hand or finger above or directly on the hot water control icon of the user interface 120 within a zone of detection of the first capacitive sensor 141, the first capacitive sensor 141 will detect a change in capacitance and will transmit a signal to increase the water temperature to controller 193 (i.e., by controlling the hot and/or cold water sources 196 and 197 via the mixing valve 160). Similarly, each time a user repeatedly places and removes their hand or finger within/from an area above or directly on the cold water control icon of the user interface 120 within a zone of detection of the second capacitive sensor 142, the second capacitive sensor 142 will detect a change in capacitance and will transmit a signal to decrease the water temperature to controller 193 (i.e., by controlling the hot and/or cold water sources 196 and 197 via the mixing valve 160). Thus, if a user repeatedly taps or places their hand/finger within a zone of detection of either sensor, the water temperature will repeatedly adjust.

According to another exemplary embodiment, a user can activate either of the first or second capacitive sensors 141 and 142 to continuously adjust the outlet water temperature by continuous physical contact with either the user interface 120 (e.g., by holding a finger directly on the user interface 120, etc.) or by continuous physical presence within a zone of detection associated with the respective sensor above the user interface 120 (e.g., by holding a hand or finger still, etc.). For example, if a user places their hand or finger above or directly on the hot water control icon of the user interface 120 within a zone of detection of the first capacitive sensor 141 for a continuous period of time (e.g., 2 or more seconds, etc.), the first capacitive sensor 141 will continuously detect a change in capacitance and will transmit a signal to continuously increase the water temperature to controller 193 (i.e., by controlling the hot and/or cold water sources 196 and 197 via the mixing valve 160). Similarly, if a user places their hand or finger in an area above or directly on the cold water control icon of the user interface 120 within a zone of detection of the second capacitive sensor 142 for a continuous period of time (e.g., 2 or more seconds, etc.), the second capacitive sensor 142 will continuously detect a change in capacitance and will transmit a signal to continuously decrease the water temperature to controller 193 (i.e., by controlling the hot and/or cold water sources 196 and 197 via the mixing valve 160). A signal to adjust the outlet water temperature can be transmitted to the controller 193 and to the mixing valve 160 until either a capacitance change is no longer detected (i.e., until the user removes their hand from the zone of detection) or the outlet water temperature reaches a maximum or minimum value programmed in the controller 193.

According to an exemplary embodiment, if a user attempts to adjust the outlet water temperature by holding a hand/finger within a zone of detection of the sensor above the user interface 120 or directly on the user interface 120 above the sensor, the controller 193 is programmed to adjust the water temperature incrementally or continuously. For example, the controller 193 includes a timer that has a built-in time period that corresponds to either an incremental adjustment or a continuous adjustment in the outlet water temperature. The timer begins counting from the moment the first or second capacitive sensors 141 or 142 detects a capacitance change until the period ends, at which point, the outlet water temperature is adjusted by one increment. Thus, if a user presses and holds their hand/finger on an outer surface of the user interface 120 above the first or second capacitive sensors 141 or 142 (or holds their hand still within the zone of detection of one the sensors) for a period of time corresponding to the period programmed in the timer, the water temperature will be adjusted by one increment after the period lapses/ends. Once the period ends and the water temperature is adjusted by one increment, the timer is reset to zero and begins counting again to continually adjust the water temperature. The process continues until the sensor no longer detects a capacitance change and/or until the water temperature reaches a maximum or minimum value, which may be programmed in the controller 193.

According to an exemplary embodiment, the controller 193 is configured to modify the built-in time period of the timer if a user is continuously adjusting the outlet water temperature so as to provide for a more rapid adjustment of the outlet water temperature. For example, if a user is attempting to continuously adjust the outlet water temperature by holding their hand or finger within a zone of detection of one of the sensors 141 or 142 for a period of time that exceeds the built-in time period for a single increment adjustment, the controller 193 will shorten the built-in time period to create a second time period, such that the water temperature will adjust more rapidly. According to an exemplary embodiment, the second time period has a duration that is half as long as the duration of the original time period if the controller 193 determines that a user is continuously adjusting the outlet water temperature.

According to an exemplary embodiment, the controller 193 is configured to prioritize water temperature change requests from a user. For example, if a user waves their hand once across the faucet assembly 100 starting at the cold water control icon and ending at the hot water control icon (e.g., moving their hand from right to left above the faucet), the controller 193 will determine that the second capacitive sensor 142 was activated first, and a signal corresponding to the desired water temperature decrease will be transmitted to the mixing valve 160. The controller 193 operates the same if a user continually waves their hand across both of the first and second capacitive sensors 141 and 142. In this circumstance, the water temperature will adjust according to which sensor is activated first each time the user waves their hand across the faucet assembly 100. In this way, the faucet assembly 100 can prioritize water temperature change requests.

According to an exemplary embodiment, the controller 193 is configured to disregard the activation of one of the first or second capacitive sensors 141 or 142 as an inadvertent act if the activation of the sensor occurs within close succession of the activation of the other sensor (i.e., is within a certain time period after activating the intended capacitive sensor). In one exemplary embodiment, close succession can be within about one second or less. For example, if a user quickly waves their hand back and forth across the first and second capacitive sensors 141 and 142, starting at the first capacitive sensor 141, moving across to the second capacitive sensor 142, and then back to the first capacitive sensor 141, the controller 193 will determine that the first capacitive sensor 141 was activated first and that the second capacitive sensor 142 was activated second. If the second capacitive sensor 142 was activated within a certain time period (e.g., within about 1 second or less, etc.) of activating the intended capacitive sensor (i.e., the first capacitive sensor 141), then the controller 193 will disregard activation of the second capacitive sensor 142 as an inadvertent act. The first capacitive sensor 141 will then transmit a signal to increase the water temperature to controller 193. According to an exemplary embodiment, the time period can be a programmable setting within the controller 193 via a software application that can be selectively adjusted by a user or an installer.

According to an exemplary embodiment, the controller 193 includes a programmable built-in delay feature that allows for a delay period between activating the first and second capacitive sensors 141 and 142. For example, if a user activates the hot water control icon (e.g., by placing their hand within a zone of detection over the first capacitive sensor 141), the system is configured to initiate a delay in which the user can no longer activate the second capacitive sensors 142 until the delay period ends. Once the delay period ends, the system will resume operating such that the user can control the water temperature again. Likewise, if a user activates the cold water control icon (e.g., by placing their hand within a zone of detection over the second capacitive sensor 142), the system is configured to initiate a delay in which the user can no longer activate the first capacitive sensor 141 until the delay period ends. According to an exemplary embodiment, the delay period can be adjusted via a software application accessible from a portable communication device to provide for an optimal user experience.

Figure 6:
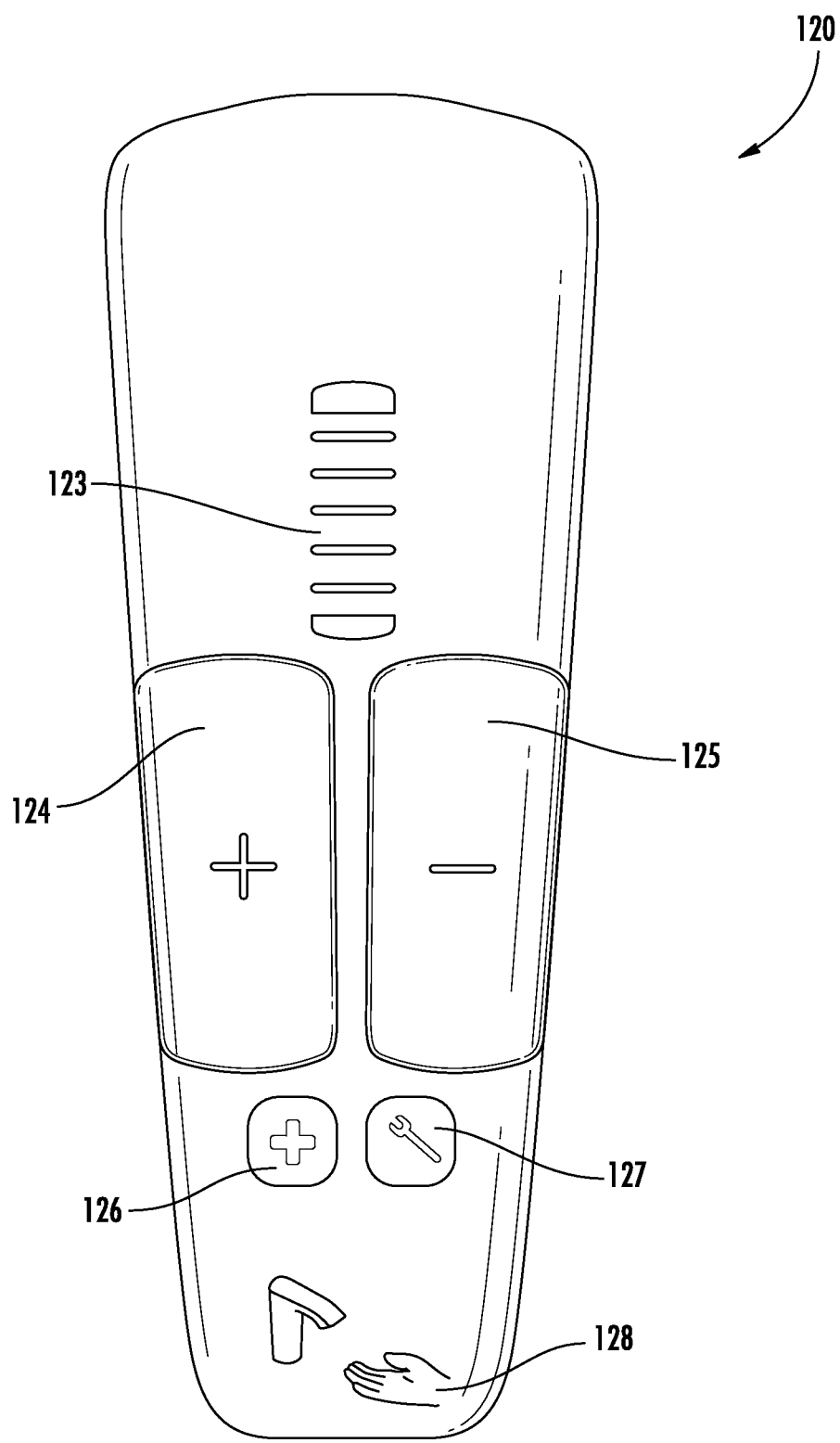
FIG. 6 is a top view of a user interface according to an exemplary embodiment.

Referring now to FIG. 6, the user interface 120 includes various indicators and graphics/icons printed on the film 122. As shown in FIG. 6, the film 122 includes a hot water control icon 124 shown as a (+) symbol and a cold water control icon 125 shown as a (−) symbol positioned adjacent the hot water control icon 124. Each of the hot and cold water control icons 124 and 125 is associated with the first and second capacitive sensors 141 and 142, respectively, which are located behind the user interface 120 on a rear inner surface of the panel member 121. The film 122 further includes an error or service indicator 127 shown as a wrench symbol below the cold water control icon 125. According to an exemplary embodiment, the error or service indicator 127 is configured to indicate whether the faucet assembly 100 is undergoing a service, such as programming, maintenance, or a similar operation. The film 122 also includes a programmed cycle indicator 126 shown as a small (+) symbol located opposite the error/service indicator 127, which is configured to indicate whether the faucet assembly 100 is undergoing a programmed cycle, such as a thermal disinfection or a cold flush cycle. The film 122 further includes a water temperature scale 123 located above the respective hot and cold water control icons 124 and 125, which is configured to display the outlet water temperature along a temperature spectrum using an LED array 145 located behind the user interface 120. According to the exemplary embodiment shown in FIG. 6, the film 122 includes a function on/off indicator 128, which is configured to provide an indication to a user of where to position their hand relative to the faucet assembly 100 to turn on a flow of water.

For example, according to the exemplary embodiment shown in FIG. 3, the first circuit board 143 includes an LED array 145. The LED array 145 includes a plurality of blue light LEDs and red light LEDs. The blue light LEDs are associated with a water temperature decrease and the red light LEDs are associated with a water temperature increase. When a user increases the water temperature by independently activating the capacitive sensor associated with a water temperature increase (i.e., the first capacitive sensor 141), the controller 193 is configured to turn on one or more red LEDs and/or turn off one or more blue LEDs in the LED array 145 to provide a visual indication to the user that the water temperature has been increased. Likewise, when a user decreases the water temperature by independently activating the capacitive sensor associated with a water temperature decrease (i.e., the second capacitive sensor 142), the controller 193 is configured to turn off one or more red LEDs in the LED array 145 and/or turn on one or more blue LEDs to provide a visual indication that the water temperature has been decreased. The user interface 120 is configured to allow light from the LED array 145 to pass through the various layers of the user interface to provide a visual indication to a user of the faucet assembly 100. In this way, the LED array 145 provides visual feedback of the outlet water temperature to a user.

According to various exemplary embodiments, one or more of the above described indicators/icons on the film 122 are configured to be illuminated/backlit using one or more light sources (e.g., LEDs, bulbs, etc.) when the respective function is on or activated. For example, according to an exemplary embodiment shown in FIG. 4, the faucet assembly includes a second circuit board 144 including one or more light sources, such as LEDs, light bulbs, or the like, to provide backlighting for various functions of the faucet assembly 100 on the user interface 120. Additionally, one or more of the indicators/icons may be hidden until turned on/activated. It is appreciated that the user interface 120 described above and depicted in the FIGURES is merely exemplary, and that other configurations or arrangements of indicators/functions are possible, including additional indicators or fewer of the above identified indicators. According to other exemplary embodiments (not shown), the user interface 120 is a separate device located near the faucet assembly 100, such as on a portion of a basin, on a wall, on a backsplash, or on another fixed structure.

Figure 7:
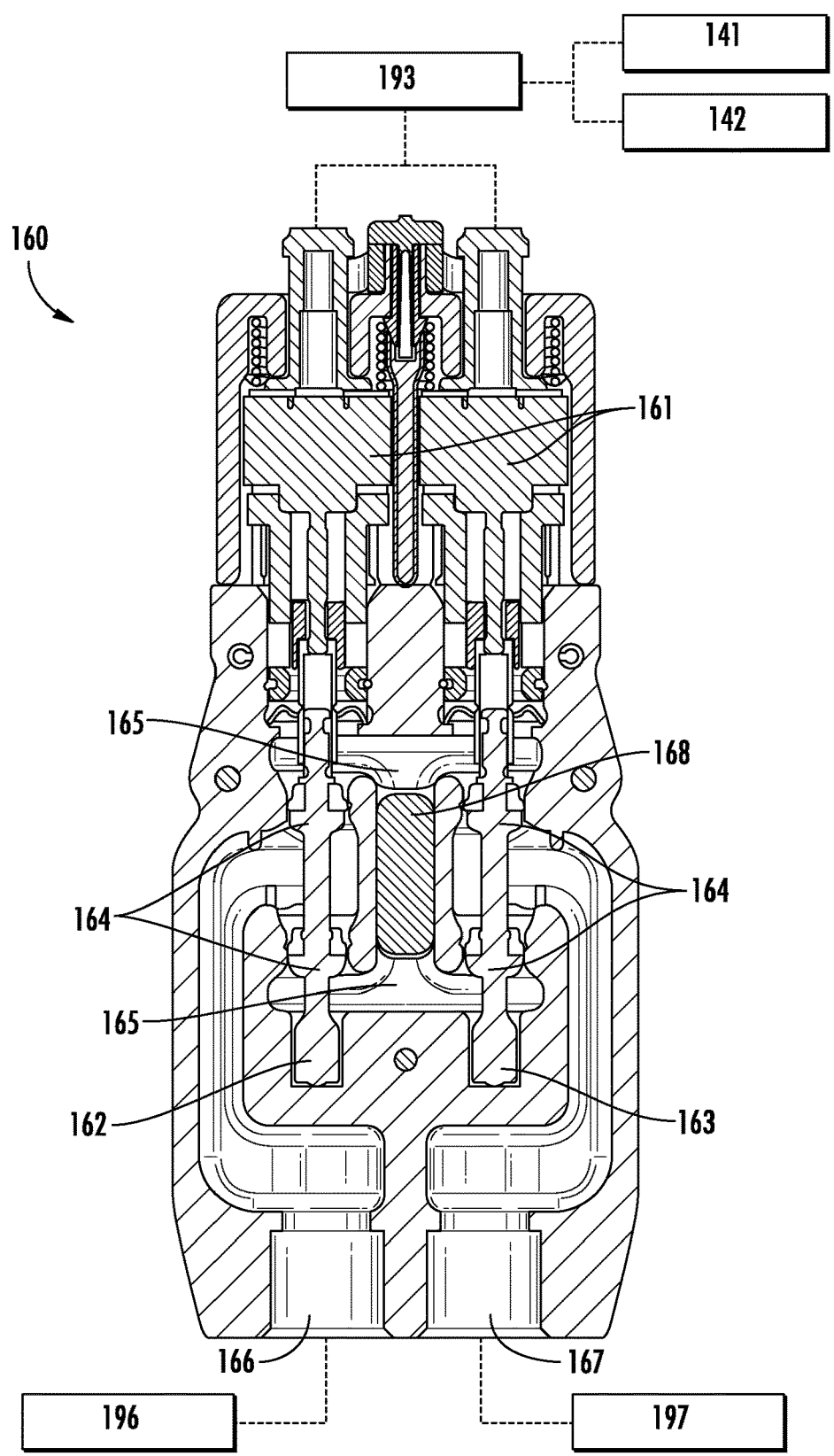
FIG. 7 is a front cross-sectional view of a mixing valve for a deck-mounted faucet assembly according to an exemplary embodiment.

According to an exemplary embodiment shown in FIG. 7, the mixing valve 160 is an electronically-controlled micro-mixing valve. The mixing valve shown in FIG. 7 is configured for use in a deck-mounted faucet assembly, although it is appreciated that the mixing valve 160 can be configured to be used in a wall-mounted tap, a shower system, a showerhead, or another type of water delivery device. The mixing valve 160 is configured to control the water temperature of a flow of water to a user by selectively and independently controlling a flow of water from hot and cold water sources 196 and 197, respectively. According to an exemplary embodiment, the mixing valve 160 is operatively (e.g., electrically) connected to the capacitive sensing module 140 and the controller 193 such that a sensed change in capacitance from the capacitive sensing module 140 corresponds to a change in temperature of a flow of water exiting the mixing valve 160 to reach an end user.

According to the exemplary embodiment shown in FIG. 7, the mixing valve 160 is operatively (e.g., electrically) connected to each of the first and second capacitive sensors 141 and 142, and to the controller 193, such as by one or more electrical cables 170 (shown in FIG. 3). The mixing valve 160 is also in fluidic communication with each of the hot and cold water sources 196 and 197 at first and second water inlets 166 and 167, respectively. As shown in FIG. 7, the mixing valve 160 includes first and second valve members 162 and 163 each independently connected to respective linear actuators, such as electronic stepper motors, which are configured to control the position of each of the valve members 162 and 163 within the valve. Each of the first and second valve members 162 and 163 is pressure balanced and includes integral shut-off sealing features 164 for controlling a flow of water into a mixing chamber 165 of the valve. The first valve member 162 controls the amount of hot water entering the mixing chamber 165 from the hot water source 196 and the second valve member 163 controls the amount of cold water entering the mixing chamber 165 from the cold water source 197. The temperature and flow rate of water leaving the mixing chamber 165 at an outlet port 168 to a user can thereby be controlled based on the positioning of each of the valve members 162 and 163 within the valve. According to an exemplary embodiment, the controller 193 is configured to maintain a constant water flow rate regardless of the amount of water temperature change requested by a user. That is to say, the controller 193 can control the relative positions of the first and the second valve members 162 and 163 within the valve to maintain a constant flow rate, but can still allow for a water temperature change to occur.

According to an exemplary embodiment, the position of each of the valve members 162 and 163 within the valve is independently controlled via the controller 193 based on a signal sent from the first or second capacitive sensors 141 and 142. For example, if a user wishes to increase the water temperature from the faucet assembly 100, the user can activate the first capacitive sensor 141 by performing a human gesture (e.g., momentary, repeated, or continuous physical contact with the user interface or physical presence within a zone of detection associated with the sensor above the user interface). A corresponding electronic signal is then transmitted to the controller 193. The controller 193 processes the signal and transmits the information to the mixing valve 160 to change the position of the first and/or second valve member 162 and 163 associated with the hot water source 196 and the cold water source 197, respectively, to thereby adjust the temperature of the water in the mixing chamber 165. Thus, if the first capacitive sensor 141 associated with a water temperature increase is activated by a user, the controller 193 will control the amount of hot and/or cold water entering the mixing valve 160, such that the temperature of the water in the mixing chamber 165 is increased, but the programmed flow rate remains constant. Similarly, if the second capacitive sensor 142 associated with a water temperature decrease is activated by a user, the controller 193 will control the amount of hot and/or cold water entering the mixing valve 160 such that the temperature of the water in the mixing chamber 165 is decreased, but the programmed flow rate remains constant.

According to an exemplary embodiment, the mixing valve 160 includes a heating element (e.g., a thermistor, etc.) installed within the valve (not shown), similar to the valve configuration disclosed in U.S. patent application Ser. No.

13/796,337, filed on Mar. 12, 2013, the entire disclosure of which is incorporated by reference herein. The heating element is configured to be in contact with the valve (e.g., extending through a portion of the metal body of the valve, etc.), such as the mixing chamber 165, to heat at least a portion of the static water contained within the valve to kill bacteria present therein. The heating element is electrically connected to a power source (e.g., power source 195) and is operatively connected to the controller 193. In various exemplary embodiments, the heating element is configured to heat at least a portion of the valve 160 such that the static water present within the valve 160 disinfects the valve and/or a portion of the faucet assembly 100, such as the fluid conduit 180 and/or the outlet 185 (see FIG. 3).

Referring now to FIGS. 8A-8B, a communications bridge 200 for faucet assembly 100 is shown according to an exemplary embodiment. FIG. 8A shows communications bridge 200 in an uninstalled state, whereas FIG. 8B shows communications bridge 200 in an installed state. As shown in FIG. 8A, communications bridge 200 is configured to be coupled to faucet assembly 100 at an upper portion thereof (e.g., above user interface 120, etc.). Faucet assembly 100 may be configured to detect the presence of communications bridge 200 via infrared communication interface 131.

According to an exemplary embodiment, the control system of the faucet assembly 100 (i.e., controller 193) includes various features that are programmable by an end user or an installer. Controller 193 may be configured to allow for the programming of features associated with faucet assembly 100 via communications bridge 200. Communications bridge 200 may be configured to receive information from an external data source and translate the information into infrared signals that can be transmitted to faucet assembly 100 via infrared communication interface 131. In some embodiments, communications bridge 200 is configured to receive wireless (e.g., Bluetooth) signals from a programming application (e.g., a software application) running on a mobile communication device (e.g., a smart phone, tablet, laptop, etc.). In other embodiments, communications bridge 200 receives information via a wired communications link.

According to various exemplary embodiments, controller 193 and communications bridge 200 allow for the programming of features associated with a water delivery device (e.g., faucet assembly 100) such as water valve configuration, network configuration, thermal disinfection schedules, cold water flush cycles, water outlet configuration, duty flush cycles, and electronic thermal disinfection schedules. The features may be programmed or configured via a user interface presented on a user device. In some embodiments, the user interface is generated by a software application running on the user device. The software application transmits the programming information and/or configuration information to communications bridge 200 via a wired or wireless communications link. Communications bridge 200 then translates the information into infrared signals and relays the infrared signals to faucet assembly 100 via infrared communication interface 131.

Additionally, the software application running on the user device may be configured to collect various types of information from faucet assembly 100 via communications bridge 200. Collected information may include, for example, a data log, usage information, an error log, and/or any other type of information that can be collected by faucet assembly 100 during operation.

As shown in FIGS. 8A-8B, communications bridge 200 includes an infrared sensor window 203 that is configured to communicate with infrared communication interface 131 on faucet assembly 100. In some embodiments, the infrared signals received from faucet assembly 100 during servicing/programming are transmitted via wireless technology (e.g., Bluetooth, NFC, WiFi, etc.) to a mobile communication device (e.g., a smartphone, a tablet, a laptop, etc.) for servicing/programming faucet assembly 100. In this manner, a user or an installer can easily service/program faucet assembly 100 without having to physically connect (e.g., using electrical wires, connectors, or the like) a communication device directly to faucet assembly 100.

According to an exemplary embodiment, communications bridge 200 includes an opening 204 at a front surface (e.g., a front portion) of communications bridge 200 for clearance of a knob or a handle that may be attached to various water delivery devices. This feature allows communications bridge 200 to be used to program other water delivery devices (e.g., a shower head, a bathtub tap, etc.). Communications bridge 200 may further include an indicator 201 located toward an upper portion of the front surface of the communications bridge 200. Indicator 201 is configured to be illuminated/lit when communications bridge 200 is powered on (e.g., during servicing or programming of the faucet assembly). Indicator 201 is in electrical communication with a power on/off button 202 located below indicator 201 on the front surface of communications bridge 200. According to other exemplary embodiments (not shown), indicator 201 and/or power on/off button 202 are located on a different portion of communications bridge 200, such as on one of the sides of communications bridge 200 or any other portion of communications bridge 200 that is accessible by a user or an installer.

According to an exemplary embodiment shown in FIG. 1, when a user or an installer accesses the servicing/programming software application via a communication device to modify/adjust various features associated with faucet assembly 100, the error/service indicator 147 on user interface 120 is configured to be illuminated to indicate that a service/programming is being performed. According to various exemplary embodiments, faucet assembly 100 can be configured to be disabled from use during a servicing/programming period. Thus, a user is unable to turn on the flow of water and/or control the water temperature or flow rate from faucet assembly 100 during a servicing/programming period.

Figure 9A:
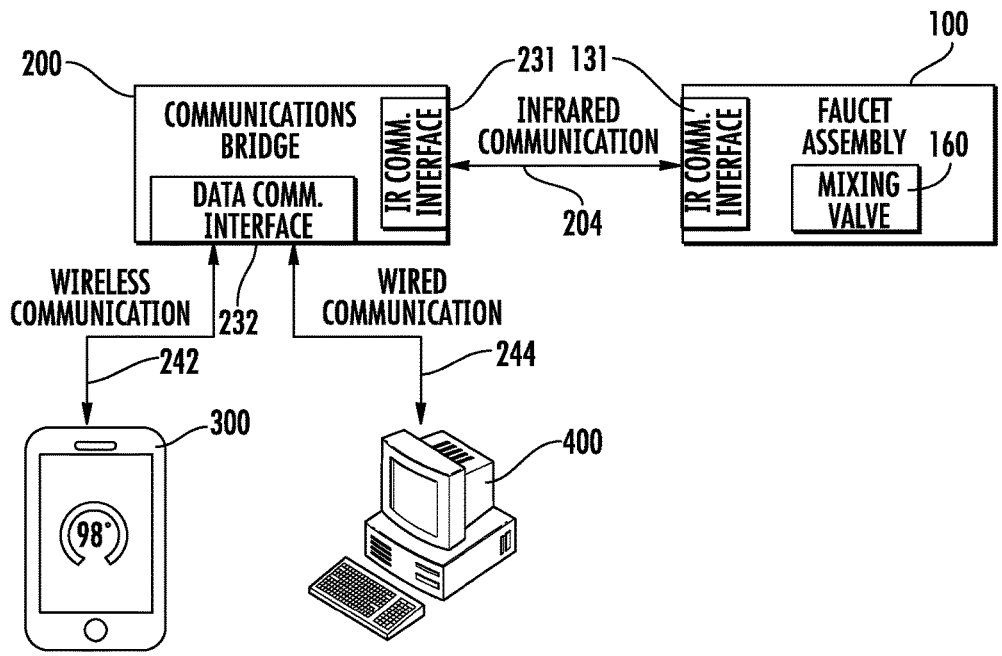
FIG. 9A is a block diagram illustrating a system configuration in which the communication bridge of FIG. 8A communicates with the faucet assembly of FIG. 1 via an infrared (IR) communications interface, and communicates directly with a user device via a separate data communications interface, according to an exemplary embodiment.
Figure 9B:
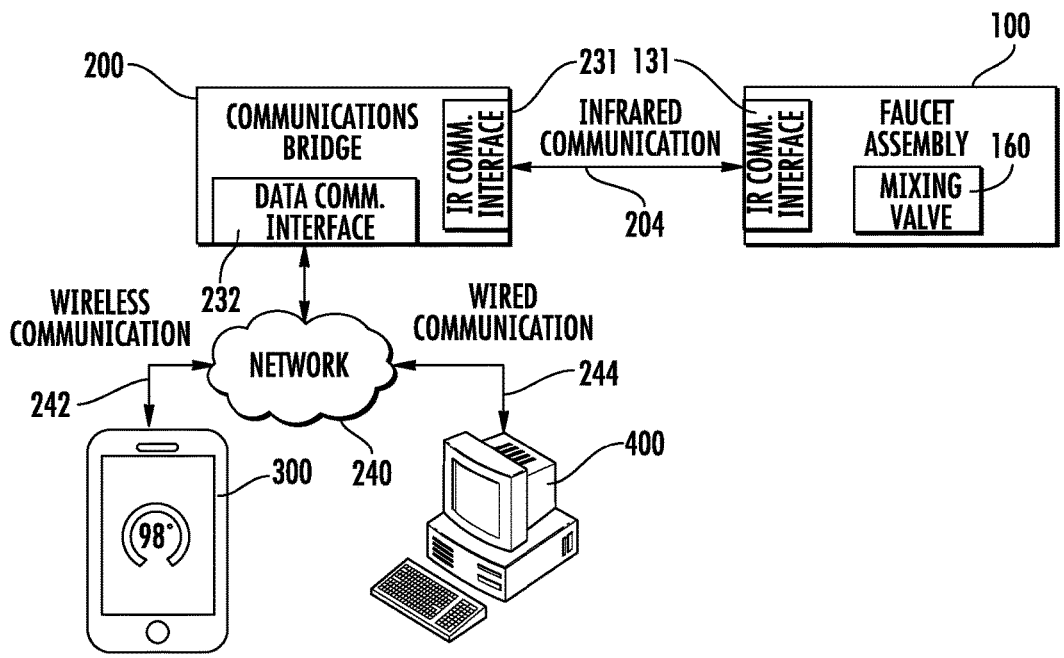
FIG. 9B is a block diagram illustrating a system configuration similar to the configuration of FIG. 9A, with the exception that the communications between the user device and the communication bridge are conducted via an intermediate communications network, according to an exemplary embodiment.

Referring now to FIGS. 9A-9B, block diagrams illustrating the functionality of communications bridge 200 are shown, according to an exemplary embodiment. Communications bridge 200 is shown to include an infrared (IR) communications interface 231 and a data communications interface 232. In some embodiments, IR communications interface 231 includes an IR emitter and/or sensor. IR communications interface 231 may be configured to establish an IR communications link 204 with IR communications interface 131 of faucet assembly 100. Although communications bridge 200 is described primarily with reference to faucet assembly 100, it should be understood that communications bridge 200 may communicate with any of a variety of water delivery devices (e.g., faucets, shower outlets, bath tub taps, toilets, water-consuming appliances, etc.).

Communications bridge 200 and faucet assembly 100 may exchange information across IR communications link 204 using any of a variety of optical communications techniques. For example, communications bridge 200 may translate programming and/or configuration data into optical light pulses that are provided to faucet assembly 100 via IR communications link 204. Faucet assembly 100 may then translate the optical light pulses to electronic programming or configuration data for use in operating mixing valve 160 and/or other components of faucet assembly 100. Similarly, faucet assembly 100 may translate logged operating data into optical light pulses that are provided to communications bridge 200 via IR communications link 204. Communications bridge 200 may then translate the optical light pulses to electronic log data for use monitoring and/or analyzing the performance of faucet assembly 100.

Data communications interface 232 may include wired or wireless communications interfaces (e.g., jacks, antennas, transmitters, receivers, transceivers, wire terminals, etc.) for conducting electronic data communications with various systems or devices. For example, data communications interface 232 is shown with a wireless communications link 242 to a mobile computing device 300 (e.g., a smart phone, a laptop, a tablet, etc.) and a wired communications link 244 to a non-mobile device 400 (e.g., a desktop computer, a user terminal, a workstation, a server, a computer system, etc.). Communications via interface 232 may be direct (e.g., local wired or wireless communications) as shown in FIG. 9A, or via a communications network 240 (e.g., a LAN, WAN, the Internet, a cellular network, etc.) as shown in FIG. 9B. For example, interface 232 may include an Ethernet card and port for sending and receiving data via an Ethernet-based communications link or network. In another exemplary embodiment, interface 232 can include a WiFi transceiver for communicating via a wireless communications network or WiFi direct communications. In another exemplary embodiment, interface 232 may include cellular or mobile phone communications transceivers, a power line communications interface, and/or any other type of wired or wireless communications hardware.

Communications bridge 200 exchange information with mobile device 300 and/or non-mobile device 400 via data communications interface 232. For example, communications bridge 200 may receive programming and/or configuration data from devices 300-400 via data communications interface 232. Communications bridge 200 may then translate the programming and/or configuration data into optical light pulses for transmission to faucet assembly 100 via IR communications interface 231. Similarly, communications bridge 200 may translate light pulses received from faucet assembly 100 via IR communications interface 231 into electronic data and transmit the electronic data to devices 300-400 via data communications interface 232.

Figure 10A:
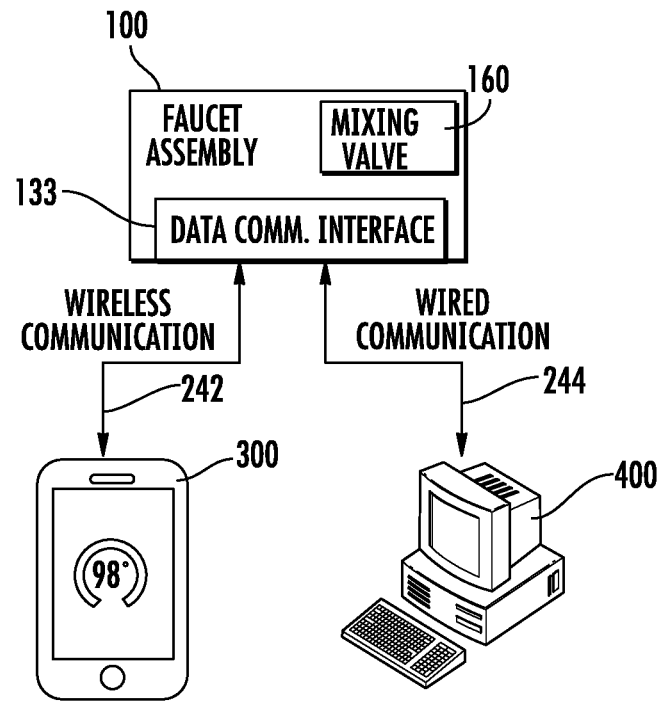
FIG. 10A is a block diagram illustrating a system configuration in which the faucet assembly of FIG. 1 communicates directly with a user device via a data communications interface, according to an exemplary embodiment.
Figure 10B:
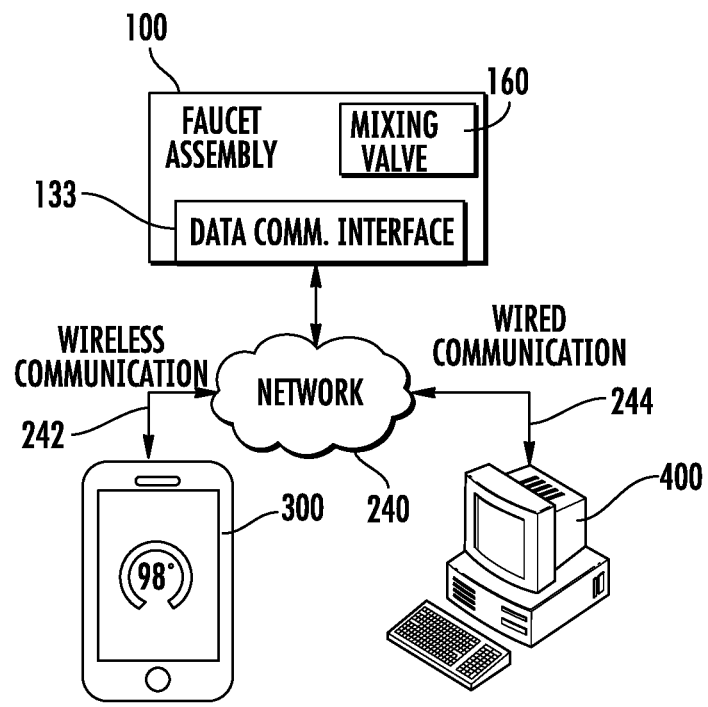
FIG. 10B is a block diagram illustrating a system configuration similar to the configuration of FIG. 10A, with the exception that the communications between the user device and the communication bridge are conducted via an intermediate communications network, according to an exemplary embodiment.

Referring now to FIGS. 10A-10B, a set of block diagrams illustrating another communications configuration that may be used by faucet assembly 100 is shown, according to an exemplary embodiment. Faucet assembly 100 is shown to include a data communications interface 133, which may be the same or similar to data communications interface 232, as described with reference to FIGS. 9A-9B. Data communications interface 133 may allow faucet assembly 100 to communicate directly with mobile device 300 and/or non-mobile device 400 without passing the communications through communications bridge 200. The communications via interface 133 may be direct wired or wireless communications (e.g., Bluetooth, NFC, WiFi-direct, USB, Ethernet, etc.) as shown in FIG. 10A, or via communications network 240 (e.g., a LAN, WAN, the Internet, a cellular network, etc.) as shown in FIG. 10B.

In FIGS. 1-10B, the present invention is described with reference to a single water delivery device (i.e., faucet assembly 100). However, it is contemplated that the present invention can be used to communicate with and/or control any number of water delivery devices (e.g., one or more faucets, shower outlets, bath tub taps, etc.) as well as other types of controllable systems or devices that can be used in conjunction with water delivery devices (e.g., a steam system, a lighting system, an audio system, etc.). For example, the present invention may be used to program, monitor, and/or control a water delivery network that includes a plurality of water delivery devices. The water delivery devices may be located in the same general area (e.g., multiple shower outlets within a single shower enclosure) or distributed throughout a building or collection of buildings (e.g., shower outlets or faucets in multiple rooms of a hotel, office building, hospital, stadium, apartment complex, etc.). A centralized control system may be used to program, monitor, and/or control the plurality of water delivery devices, steam devices, lighting devices, audio devices, and/or any other devices that may be used therewith. FIGS. 11-14 describe various embodiments of the present invention in accordance with such an implementation.

Figure 11:
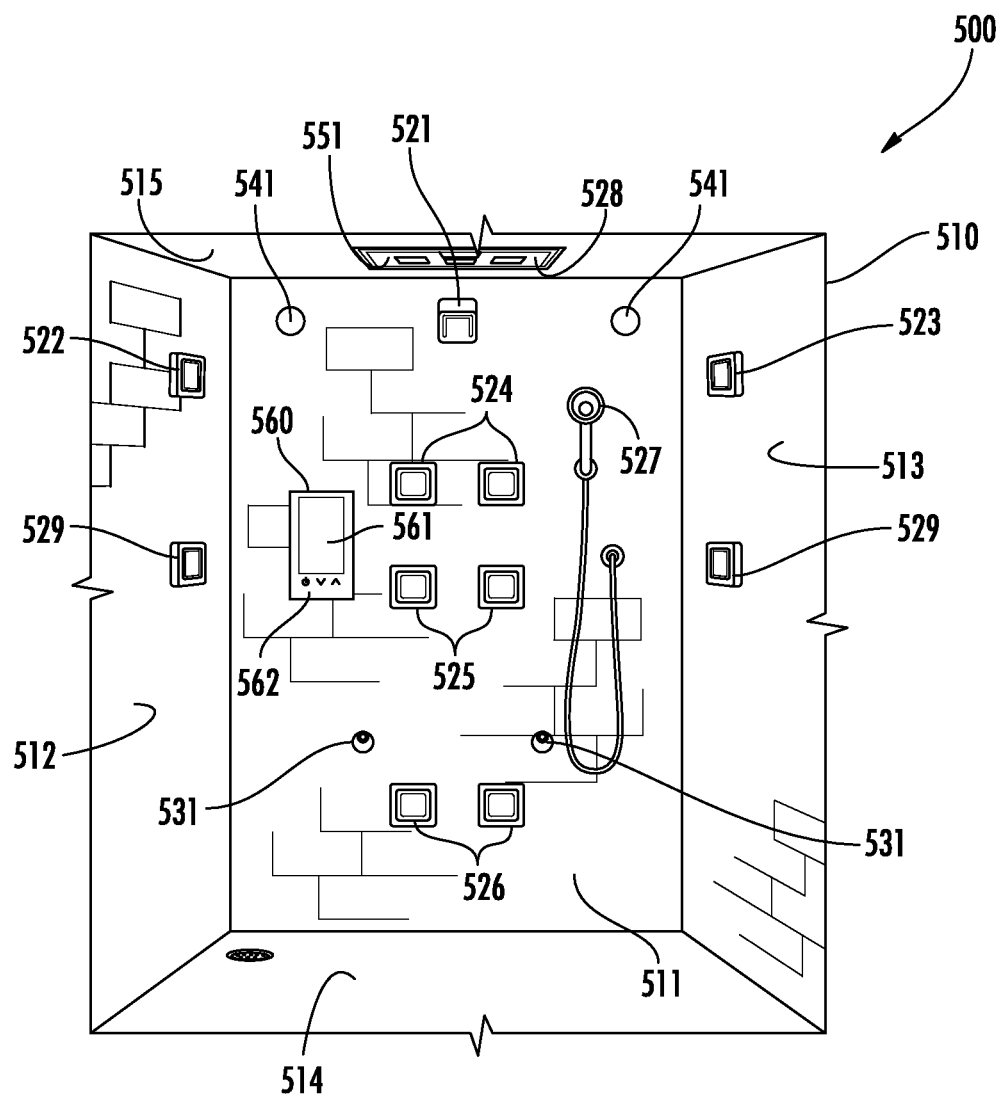
FIG. 11 is a drawing of a shower including a variety of shower outlets that can be operated using one or more of the mixing valves of FIG. 7, as well as other output devices (i.e., speakers, lighting devices, and steam outlets) that can be operated therewith, according to an exemplary embodiment.

Referring now to FIG. 11, a shower 500 is shown, according to an exemplary embodiment. Shower 500 includes a shower enclosure 510 having a front wall 511, left wall 512, right wall 513, floor 514, and ceiling 515. An access door may permit entry by the user into shower enclosure 510. The control systems and methods of the present disclosure may be used in combination with shower 500 or any other shower having any shape or size of shower enclosure. For example, alternative shower enclosures may contain fewer or additional walls, be of varying sizes, contain other water outlets or lighting arrangements, or be otherwise configured.

Shower 500 includes a water subsystem having various water delivery devices (i.e., shower outlets) located within shower enclosure 510. For example, shower 500 is shown to include a front showerhead 521, a left showerhead 522, a right showerhead 523, an upper body spray 524, a middle body spray 525, a lower body spray 526, side body sprays 529, a handshower 527, and a rainhead 528. In various embodiments, the water subsystem or set of water delivery devices may include any number or combinations of water delivery devices. For example, in an alternative exemplary embodiment, the water subsystem may include a central body spray (e.g., a vertical column of shower outlets) in place of upper body spray 524 and middle body spray 525. In another exemplary embodiment, left showerhead 522 and right showerhead 523 may be located on front wall 511. Shower outlets 521-529 may be located on any of surfaces 511-514 and may include additional or fewer shower outlets in various embodiments.

The water subsystem may include one or more analog or digital valves, such as mixing valve 160. Each of the valves may be associated with one or more of shower outlets 521-529 and may be configured to control the water temperature and/or flow rate of the water delivered by the associated shower outlet(s). Valves of the system may be configured to allow for an electronically controlled mixing of hot and cold water. Such mixing can allow control systems and methods described herein to achieve or approach certain target temperatures (i.e., temperature control). Valves of the system may also be configured to allow for electronically controlled or selected shower outlet water flow (i.e., flow rate control). The electronically controlled valves (e.g., solenoids for actuating the hydraulic valves) are controlled via control signals from one or more controllers of the shower control systems described throughout this disclosure.

In some embodiments, each of shower outlets 521-529 is associated with a different valve configured to control the water temperature and/or flow rate of the water dispensed from the corresponding shower outlet. For example, an instance of mixing valve 160 may be installed upstream of each of shower outlets 521-529, combined with each of shower outlets 521-529, or otherwise fluidly connected with each of shower outlets 521-529. Each of the mixing valves 160 may be independently controlled by a controller to allow for independent control of the temperatures and/or flow rates of the water dispensed from shower outlets 521-529. An example of such a configuration is described in greater detail with reference to FIG. 12. In other embodiments, a single mixing valve 160 is used to control the temperature and/or flow rate of water provided to the various shower outlets.

In some embodiments, each of the valves is associated with a subset of shower outlets 521-529. For example, each mixing valve 160 may have a plurality of outlet ports (e.g., three outlet ports, six outlet ports, etc.), each of which is fluidly connected to one or more of shower outlets 521-529. In other instances, one or more of mixing valves 160 may output water to a pipeline that includes several branches, each of which is fluidly connected to one or more of shower outlets 521-529. A first mixing valve may control the temperature of water provided to a first subset of shower outlets 521-529, whereas a second mixing valve may control the temperature of water provided to a second subset of shower outlets 521-529. For example, a first mixing valve may control the temperature of water provided to shower outlets 521, 525, and 528, whereas a second mixing valve may control the temperature of water provided to shower outlets 522, 523, 524, 526, and 527. Advantageously, using multiple different mixing valves allows the water from different shower outlets to have different temperatures and/or flow rates. In various embodiments, any number of mixing valves 160 may be used to define any number of temperature zones.

In some embodiments, shower 500 includes a steam subsystem. The steam subsystem includes steam outlets 531 that receive steam from a steam generator in fluid communication with steam outlets 531. The steam generator is disposed between, and coupled via conduit (e.g., piping or tubing), to steam outlets 531 and a water supply. The steam generator heats the water, turning it into steam that is then communicated into shower enclosure 510 through steam outlets 531. The steam generator are controlled via control signals from one or more controllers of the shower control systems described throughout this disclosure.

In some embodiments, shower 500 includes an audio subsystem. The audio subsystem includes speakers 541, an amplifier, and a media player. The amplifier, media player, and other components may be located proximate to or remote from shower enclosure 510. The audio subsystem is configured to communicate sound into shower enclosure 510. The audio subsystem (e.g., a media player thereof) may be controlled via control signals from one or more controllers of the shower control systems described throughout this disclosure.

In some embodiments, shower 500 includes a lighting subsystem. The lighting subsystem includes one or more lights 551, such as conventional light bulbs (e.g., incandescent, LED, fluorescent) or a plurality of colored lights configured for use as a lighted rain panel used for chromatherapy. In some embodiments, lights 551 are integrated with rainhead 528. The lighting subsystem is configured to selectively supply light into shower enclosure 510. The lighting subsystem (e.g., particular switches for the lights, dimmers for the lights, etc.) may be controlled via control signals from one or more controllers of the shower control systems described throughout this disclosure.

In some embodiments, a control panel 560 is configured to receive user inputs for controlling the shower subsystems and for communicating settings and status information of the shower subsystems to a user. Control panel 560 generally includes a housing and an electronic display 561 (e.g., a LCD panel). The housing includes various attachment points (e.g., brackets, fasteners, portions for receiving screw heads, etc.) for mounting control panel 560 within shower enclosure 510. The housing also provides a waterproof casing to protect electronic display 561 and associated internal electronic components from moisture. A touch-sensitive panel (e.g., a capacitive touch panel) may also be provided on the housing for receiving user inputs. A portion of the touch-sensitive panel may overlay electronic display 561 to provide a touchscreen interface. Electronic display 561 can be caused to display graphical user interfaces and to receive user inputs via the touch screen interface.

In some embodiments, another portion of the touch-sensitive panel (or a different touch-sensitive panel) overlays one or more illuminated buttons 562 that are not part of electronic display 561. Buttons 562 may be backlit (e.g., by a LED) using a separate lighting source. Buttons 562 may be touch sensitive (e.g., capacitive touch) or a group of hard keys (e.g., physical buttons). Buttons 562 may be static buttons which are selectively illuminated by activating or deactivating the backlighting for each button. In some embodiments, the same touch-sensitive panel overlays both electronic display 561 and buttons 562.

Figure 12:
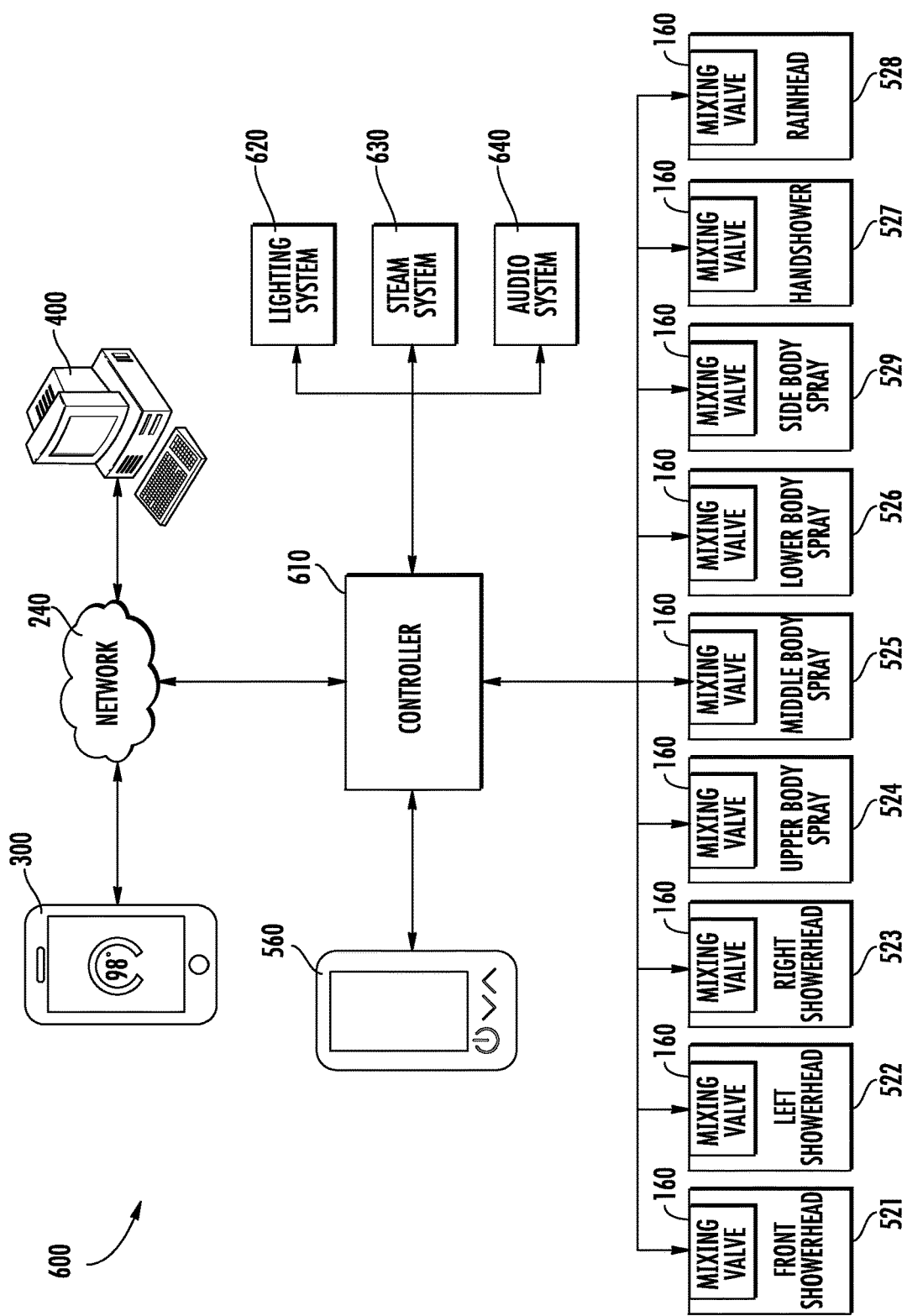
FIG. 12 is a block diagram of a shower control system including a central configured to monitor and control the mixing valves and the other output devices in the shower of FIG. 11, according to an exemplary embodiment.

Referring now to FIG. 12, a block diagram illustrating a shower control system 600 is shown, according to an exemplary embodiment. Shower control system 600 may be used to monitor and control a plurality water delivery devices (e.g., shower outlets 521-529, faucet assembly 100, etc.) as well as other controllable devices that may be used therewith (e.g., steam outlets 531, speakers 541, lighting 551). In some embodiments, shower control system 600 is used to monitor and control shower 500. For example, shower control system 600 is shown to include a plurality of mixing valves 160, each of which is associated with one of shower outlets 521-529. Each mixing valve 160 may be configured to affect the temperature and/or flow rate of the water dispensed from the corresponding shower outlet.

Mixing valves 160 may communicate with a controller 610 configured to monitor and control mixing valves 160. For example, mixing valves 160 may receive a control signal from controller 610 that causes mixing valves 160 to variably open or close to achieve a target water temperature and/or flow rate. In some embodiments, mixing valves 160 include temperature sensors and/or flow rate sensors configured to measure the temperature and/or flow rate of the water dispensed by each of mixing valves 160. In other embodiments, the sensors may be integrated with shower outlets 521-529 or otherwise located in shower control system 600. The sensors may provide feedback to controller 610 regarding the temperatures and/or flow rates of the water dispensed by each of mixing valves 160. Controller 610 may use the feedback from the sensors in conjunction with one or more temperature and/or flow rate setpoints to determine an appropriate control signal for each of mixing valves 160. The communications between mixing valves 160, controller 610, and the sensors may be wired or wireless, and may use any of a variety of communications protocols.

Shower control system 600 is shown to include a lighting system 620, a steam system 630, and an audio system 640.

Lighting system 620 may include one or more lights 551 configured to selectively supply light into shower enclosure 510 (e.g., chromotherapy lights, ambient lights, rainhead lights, etc.). Lighting system 620 may also include various lights or lighting fixtures located in proximity to shower enclosure 510 (e.g., within the same room or zone) or separate from shower enclosure 510 (e.g., in a separate room or zone). Steam system 630 may include one or more steam generators configured to supply steam to steam outlets 531 within shower enclosure 510 and/or to other steam output devices. Audio system 640 may include a media player, an amplifier, and/or speakers. The speakers may be located within shower enclosure 510 (e.g., speakers 541) or otherwise located in proximity to shower enclosure 510 or in a different room or zone.

Lighting system 620, steam system 630, and audio system 640 may communicate with controller 610 via a wired or wireless communications link. Controller 610 may provide control signals to lighting system 620, steam system 630, and audio system 640 to control the output devices thereof (e.g., lights, steam outlets, speakers, etc.). In various embodiments, controller 610 may communicate directly with the output devices of systems 620-640 or with one or more intermediate controllers (e.g., a lighting controller, a steam controller, a music controller, etc.) configured to control the output devices of one or more of systems 620-640.

In some embodiments, controller 610 communicates with control panel 560 via a wired or wireless communications link. Controller 610 may be configured to receive and process user inputs from control panel 560 and to control shower outlets 521-529, lighting system 620, steam system 630, and/or audio system 640 in accordance with the user inputs. For example, control panel 560 may present a user interface that allows a user to view and modify setpoints for mixing valves 160 (e.g., temperature setpoints, flow rate setpoints, etc.), to initiate or stop water flow from shower outlets 521-529 (e.g., individually or as one or more groups), to run a predefined sequence of water outputs from shower outlets 521-529, and/or to otherwise interact with or control shower outlets 521-529.

Control panel 560 and controller 610 may facilitate user interactions with lighting system 620, steam system 630, and audio system 640. For example, a user can provide inputs via control panel 560 to turn on or off lighting, initiate a chromotherapy sequence, or otherwise monitor and control lighting system 620. The user can provide inputs via control panel 560 to view and modify steam temperature setpoints, start or stop steam from steam outlets 531, or otherwise monitor and control steam system 630. The user can provide inputs via control panel 560 start or stop playback from speakers 541, select an audio source, increase or decrease audio volume, or otherwise monitor and control audio system 640. In some embodiments, the user interface allows a user to select and initiate a spa experience that automatically operates one or more of mixing valves 160, lighting system 620, steam system 630, and audio system 640 using a predefined sequence of outputs to provide a multi-sensory user experience. Exemplary user interfaces and spa experiences that may be generated and used by shower control system 600 are described in greater detail in U.S. patent application Ser. No. 14/610,296 filed Jan. 30, 2015, the entire disclosure of which is incorporated by reference herein.

In some embodiments, shower control system 600 includes multiple control panels 560. Each of control panels 560 may be disposed at a different location (e.g., in shower 500, outside shower 500, in a different shower, etc.) for facilitating user interaction with shower control system 600 at multiple different locations. Each control panel 560 may be associated with one or more discrete showers that can be controlled by shower control system 600. For example, the showers may be located in different rooms within the same house, hotel, apartment complex, hospital, or the like. An instance of control panel 560 may be located proximate to each of the showers to allow user control over the corresponding shower and devices thereof (e.g., valves 160, lighting system 620, steam system 630, audio system 640, etc.). For example, a control panel 560 within a particular hotel room may allow a user to control the devices within that hotel room.

In some embodiments, each instance of control panel 560 is associated with a corresponding instance of controller 610. For example, one instance of controller 610 may control the devices within a particular room, whereas another instance of controller 610 may control the devices within another room. In other embodiments, controller 610 is a centralized controller that receives and processes inputs from multiple control panels 560. A centralized controller 610 may control the devices within multiple different rooms or zones based on the user inputs provided via the control panel(s) 560 for that room or zone.

In various embodiments, controller 610 may be integrated with one or more of control panels 560 or separate from control panels 560. Controller 610 may receive input from control panels 560 and may control the user interfaces provided via electronic display 561. Controller 610 processes user inputs received at control panels 560 (e.g., user inputs received via a touchscreen, buttons, switches, or other user input devices of control panel 560) and provides control outputs to valves 160, lighting system 620, steam system 630, and audio system 640 based on the user inputs.

In some embodiments, controller 610 is connected to a network 240 (e.g., a LAN, a WAN, a WiFi network, the Internet, a cellular network, etc.) configured to facilitate interactions with controller 610. For example, a user can communicate with controller 610 via network 240 using any of a variety of mobile devices 300 (e.g., a laptop computer, a tablet, a smart phone, etc.) or non-mobile devices 400 (e.g., a desktop computer, a workstation, a server, etc.). Communications via network 240 may allow a user to view and modify various configuration settings stored within controller 610 (e.g., valve configuration settings, network configuration settings, water outlet configuration settings, flush cycles, etc.) and to receive information from controller 610 (e.g., usage information, log data, etc.). In some embodiments, communications via network 240 can be used to actively control the outputs from various devices (e.g., starting and stopping water flow, adjusting setpoints, turning on/off lighting, steam, audio, etc.).

In some embodiments, the user interface presented via control panel 560 also allows the user to view and modify configuration settings, and to retrieve information from controller 610. The user interactivity options available via control panel 560 may include some or all of the operations that can be performed via network 240. In some embodiments, the user interactivity options available via control panel 560 are limited to a subset of the operations available via network 240. For example, a system administrator may configure each control panel 560 to allow a user to control a set of devices without allowing the user to modify configuration settings. The options available to a user via control panel 560 may be defined by configuration parameters stored within controller 610, which can be modified via network 240.

In some embodiments, controller 610 is configured to receive updates via network 240. For example, controller 610 may be configured to receive firmware updates, software updates, configuration updates, or other updates from a remote server (e.g., from the system manufacturer) or other network data source (e.g., a networked user device). In various embodiments, controller 610 may be configured to check for and download updates periodically or may receive pushed updates from a remote data source when the updates become available. Advantageously, updating controller 610 via network 240 allows for new and improved spa experiences, user interfaces, and/or other features to be provided to multiple controllers 610 in an automated manner. Controller 610 can then install the updates to make the new and improved features available to a user.

Figure 13:
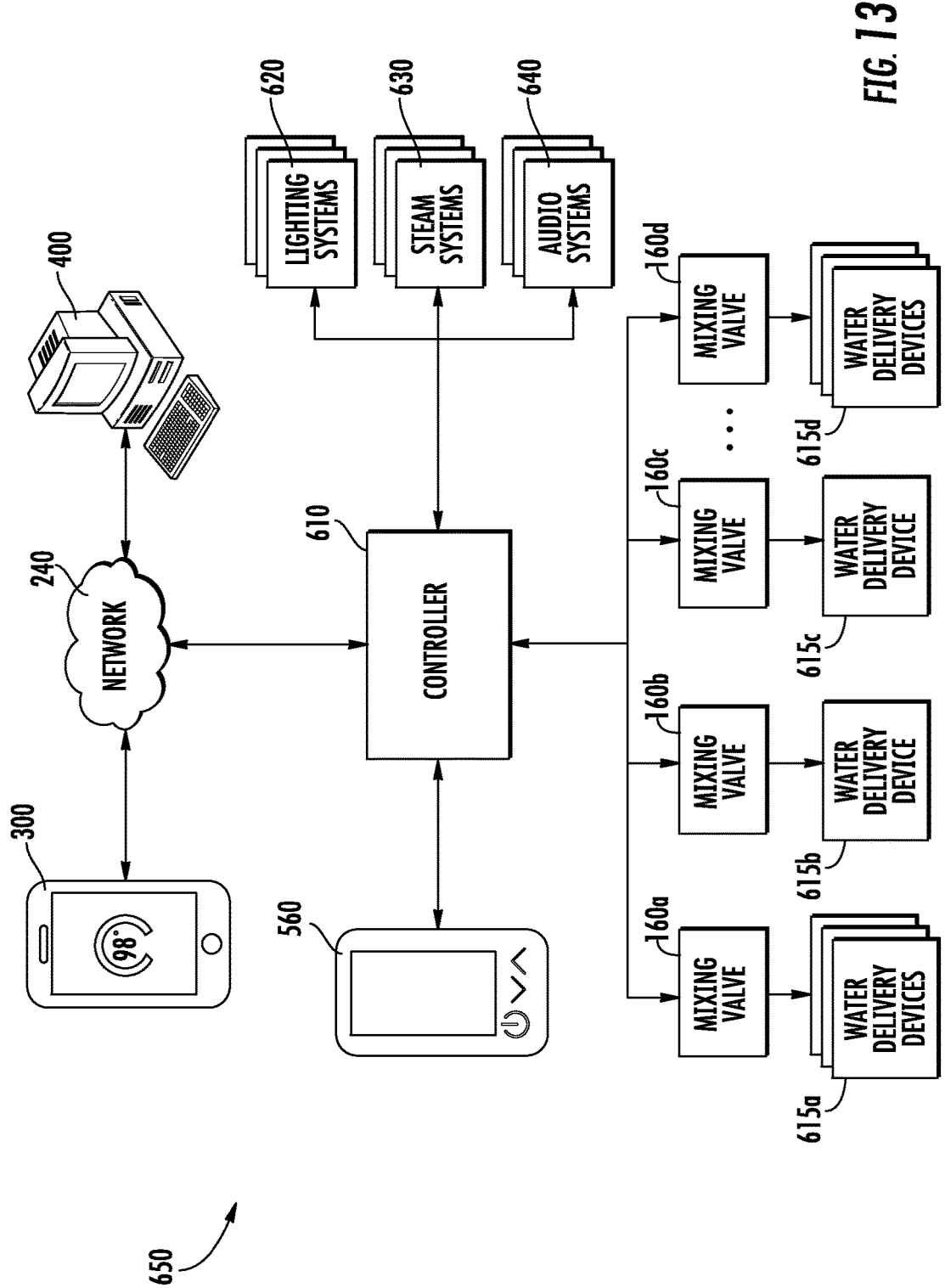
FIG. 13 is a block diagram of another shower control system in which the controller of FIG. 12 is used to control a plurality of the mixing valves of FIG. 7, each of which affects the water dispensed by a different set of water delivery devices located in different rooms or zones of a facility, according to an exemplary embodiment.

Referring now to FIG. 13, a block diagram of another control system 650 is shown, according to an exemplary embodiment. Control system 650 is shown to include many of the same components as control system 600. However, in control system 650, each mixing valve 160a-160d is associated with one or more water delivery devices 615a-615d rather than a specific shower outlet. Each mixing valve 160a-160d may be an instance of mixing valve 160, as described with reference to FIG. 7. Mixing valves 160a and 160d are shown providing water to a plurality of water delivery devices 615a and 615d, respectively. Water delivery devices 615a and 615d may be sets of shower outlets, faucets, bath tub taps, etc. within the same temperature group. Mixing valves 160b and 160c are shown providing water to a single water delivery device 615b and 615c, respectively. Water delivery devices 615b and 615c may be individual shower outlets, faucets, bath tub taps, etc.

In some embodiments, mixing valves 160a-160d are located within the same general area (e.g., behind the wall of a shower enclosure, within a bathroom, etc.) and configured to provide water to various water delivery devices in that area. For example, mixing valves 160a-160d may be configured to provide water to various shower outlets within the same shower enclosure, as described with reference to FIGS. 11-12. In other embodiments, mixing valves 160a-160d are located in different physical areas (e.g., within different hotel rooms, apartments, hospital rooms, etc.) and configured to provide water to water delivery devices located in each of the different physical areas. For example, mixing valves 160a-160b may be located within a first hotel room and configured to provide water to water delivery devices 615a-615b within the first hotel room, whereas mixing valves 160c-160d may be located within a second hotel room and configured to provide water to water delivery devices 615c-615d within the second hotel room.

Each set of water delivery devices 615a-615d may be associated with one or more controllers 610 configured to monitor and control water delivery devices 615a-615d. In various embodiments, controller 610 may be a centralized controller for all of water delivery devices 615a-615d or a local controller for a subset of water delivery devices 615a-615d (e.g., a set of water delivery devices 615a-615d located within the same room or zone). Controller(s) 610 may also be configured to monitor and control one or more lighting systems 620, steam systems 630, and/or audio systems 640, as described with reference to FIG. 12. One or more control panels 560 may be provided to facilitate user interaction with controller(s) 610 and the controllable devices associated therewith.

In some embodiments, control system 650 allows for the programming of a single water delivery device or multiple water delivery devices and/or the controller(s) 610 associated therewith via network 240. This is particularly advantageous in that it allows for the programming of one or more water delivery devices and/or controllers 610 individually from a single location (e.g., via a single communication device such as mobile device 300 or non-mobile device 400). Multiple control systems 650 and the components thereof can be programmed and updated via network 240 from centralized location (e.g., from a user device and/or a remote server), as described with reference to FIG. 12.

Figure 14:
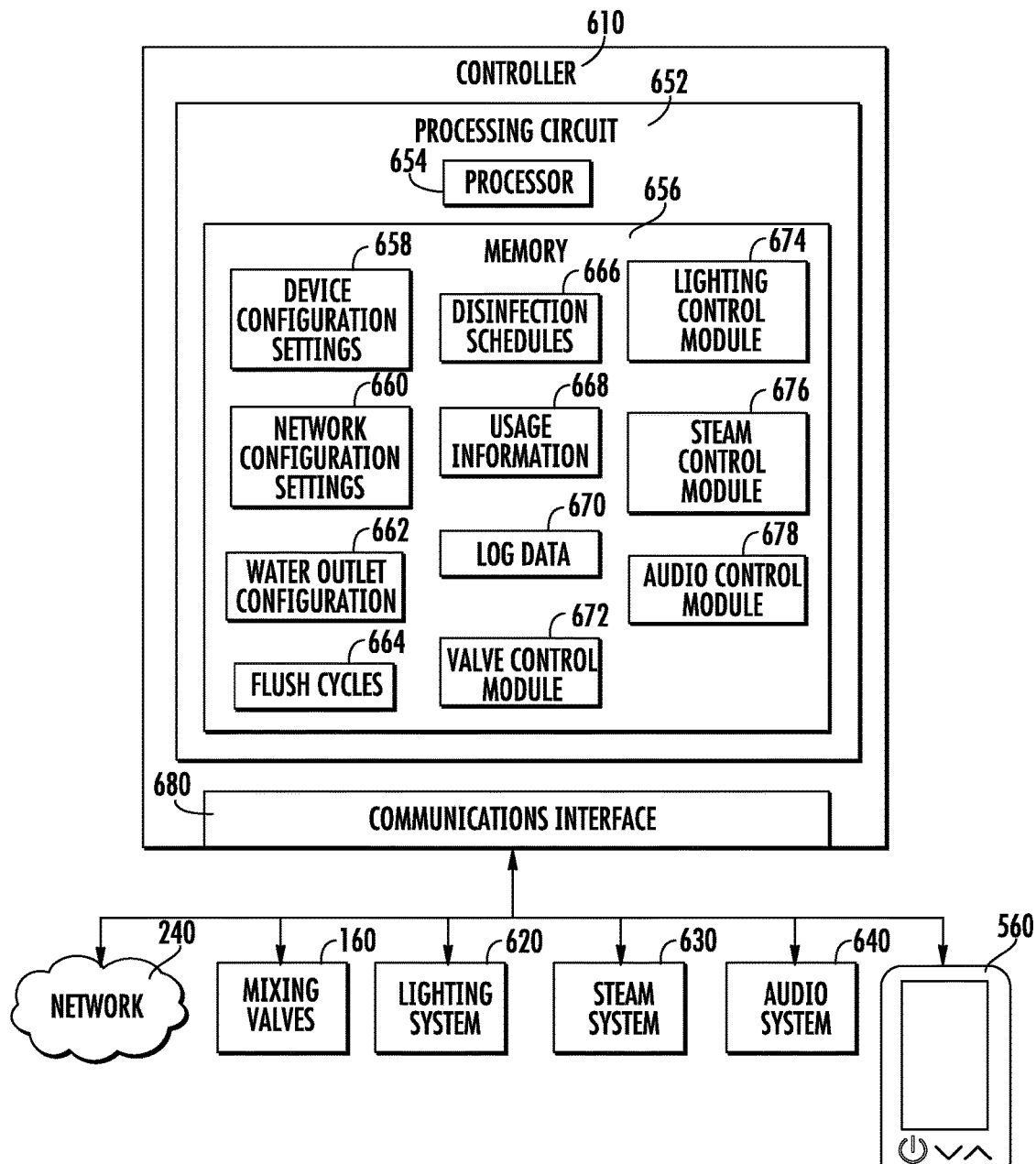
FIG. 14 is a block diagram illustrating the controller of FIG. 12 in greater detail, according to an exemplary embodiment.

Referring now to FIG. 14, a block diagram illustrating controller 610 in greater detail is shown, according to an exemplary embodiment. Controller 610 may be a central controller for a plurality of rooms or zones (e.g., a building management system controller in a hospital, residential building, office building, etc.) or a local controller for a particular room or zone (e.g., a controller for a particular shower area). Controller 610 is shown to include a communications interface 680 and a processing circuit 652.

Communications interface 680 may include wired or wireless communications interfaces (e.g., jacks, antennas, transmitters, receivers, transceivers, wire terminals, etc.) for conducting electronic data communications with various systems or devices. For example, communications interface 680 is may be used to communicate with network 240, mixing valves 160, lighting system 620, steam system 630, audio system 640, and/or control panel 560. Communications via interface 680 may be direct (e.g., local wired or wireless communications), or via communications network 240 (e.g., a LAN, WAN, the Internet, a cellular network, etc.). For example, communications interface 680 may include an Ethernet card and port for sending and receiving data via an Ethernet-based communications link or network. In another exemplary embodiment, communications interface 680 can include a WiFi transceiver for communicating via a wireless communications network or WiFi direct communications. In another exemplary embodiment, communications interface 680 may include cellular or mobile phone communications transceivers, a power line communications interface, and/or any other type of wired or wireless communications hardware. In some embodiments, communications interface 680 includes an infrared (IR) communications interface (e.g., IR communications interface 131) configured to receive IR communications from a communications bridge (e.g., communications bridge 200) or another IR data source.

Processing circuit 652 is shown to include a processor 654 and memory 656. Processor 654 can be implemented as a general purpose processor, an application specific integrated circuit (ASIC), one or more field programmable gate arrays (FPGAs), a group of processing components, or other suitable electronic processing components. Memory 656 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 656 may be or include volatile memory or non-volatile memory, and may include database components, object code components, script components, or any other type of information structure for supporting the various activities and information structures described in the present application. According to an exemplary embodiment, memory 656 is communicably connected to processor 654 via processing circuit 652 and includes computer code for executing (e.g., by processing circuit 652 and/or the processor 654) one or more processes described herein.

Still referring to FIG. 14, memory 656 is shown to include device configuration settings 658. Device configuration settings 658 may include programmable features/settings associated with the various devices controlled by controller 610 such as valves 160, lighting system 620, steam system 630, audio system 640, etc. For example, device configuration settings 658 may include water set point temperatures, modes of operation (e.g., full cold water mode), default flow rate, flow rate change increments, timeout duration, run time, reaction time, blocking time, and other similar features for valves 160. Device configuration settings 658 may also include configuration settings for lighting system 620, steam system 630, and audio system 640. In some embodiments, device configuration settings 658 include spa experiences defining programmed sequences of outputs from the output devices. Additional examples of configuration settings which may be stored in device configuration settings 658 are described in U.S. patent application Ser. No. 14/610,296.

Device configuration settings 658 can be programmed by a user via network 240 or control panel 560, or received as part of a packaged update from a remote data source. For example, when a user or an installer adjusts any one of the above settings via control panel 560 or user devices 300-400, the changed information may be communicated to controller 610 via communications interface 680 and stored in memory 656. In some embodiments, the changed information is communicated via communications bridge 200 to the controller 610, which transmits the information to the appropriate device/component (e.g., to each of the valves associated with the water delivery device).

Memory 656 is shown to include network configuration settings 660. Network configuration settings 660 may define the types of communications used by controller 610 (e.g., infrared, WiFi, Ethernet, USB, etc.) and/or the network locations of various external components with which controller 610 communicates. For example, network configuration settings 660 may specify a wireless or wired network to which controller 660 is connected (e.g., a LAN), and may include any network information (e.g., SSID, passwords, network key, authentication type, etc.) necessary to connect to the network. Network configuration settings 660 may also define whether controller 610 is set to receive updates via network 240 from a networked data source, and may specify the network location (e.g., URL, IP address, etc.) of the networked data source. Network configuration settings can be programmed by a user via network 240 or control panel 560, or received as part of a packaged update from a remote data source.

Still referring to FIG. 14, memory 656 is shown to include a water outlet configuration 662. Water outlet configuration 662 may store data describing the particular configuration of the water delivery devices controlled by controller 610. For example, water outlet configuration 662 may define which of the water delivery devices are connected to the same valve, which of the water delivery devices are within the same control group (i.e., groups of devices that can be controlled together), the locations of the water delivery devices (e.g., within a particular room or zone of a facility), and/or any other information relating to the configuration of the water outlets. Water outlet configuration 662 can be programmed by a user via network 240 or control panel 560, or received as part of a packaged update from a remote data source.

Memory 656 is shown to include flush cycles 664. Flush cycles 664 may store data relating to a duty flush cycle and/or a cold flush cycle of one or more water delivery devices. Programmable features/settings associated with a duty flush cycle of one or water delivery devices may include the type of duty flush (e.g., standard, standard oscillation, smart, and smart oscillation), frequency time, flush activation time, flush duration, flush temperature, flush flow rate, full cold water pre-flush time, and duty flush warm-up time. Programmable features/settings associated with a cold flush cycle of one or water delivery devices includes the type of cold flush (e.g., standard, standard oscillation, smart, smart oscillation, etc.), frequency time, flush activation time, flush duration, flush temperature, and full cold water pre-flush time. Flush cycles 664 can be programmed by a user via network 240 or control panel 560, or received as part of a packaged update from a remote data source.

Still referring to FIG. 14, memory 656 is shown to include disinfection schedules 666. Disinfection schedules 666 may include a thermal disinfection schedule and/or an electrical disinfection schedule for one or more water delivery devices. Thermal disinfection may be accomplished by controlling a heating element located within a mixing valve. The heating element can be controlled to heat the valve such that the water contained within the valve acts as a disinfectant for at least a portion of the valve. Programmable features/settings associated with thermal disinfection include the target water temperature(s), disinfection timeout period, disinfection warm-up time, and total disinfection time. Programmable features/settings associated with electrical disinfection include disinfection frequency time, disinfection activation time, and disinfection timeout period. Disinfection schedules 666 can be programmed by a user via network 240 or control panel 560, or received as part of a packaged update from a remote data source.

Memory 656 is shown to include usage information 668 and log data 670. In some embodiments, controller 610 is configured to log data relating to events such as water usage, duty flush cycles, and thermal disinfection events. The data may be stored in memory 656 and transmitted to an external device (e.g., user devices 300-400, control panel 560) for analysis and reference. According to an exemplary embodiment, the data relating to the above noted events is automatically logged by the controller 560 for up to a 12 month period. This is advantageous in that it allows for the monitoring and analysis of one or more water delivery devices to determine future cost allocation associated with water usage, to analyze previous usage trends, to determine optimized maintenance schedules, and to predict future water usage. Usage information 668 and log data 670 may be automatically stored in memory 656 during operation. Controller 610 may be configured to retrieve usage information 668 and log data 670 from memory 656 (e.g., periodically and/or upon request from an external system or device) and send usage information 668 and log data 670 to an external system or device via communications interface 680.

Additionally, it is appreciated that the programmable features/settings disclosed herein are merely exemplary, and that additional programmable features associated with water delivery control may be included in the control architecture.

Still referring to FIG. 14, memory 656 is shown to include a valve control module 672. Valve control module 672 may be configured to monitor and control mixing valves 160. Monitoring a mixing valve may include receiving feedback signals indicating the current state of the valves and/or attributes of the water dispensed by the valves. Controlling mixing valves 160 may include generating control signals for mixing valves 160. The control signals may instruct one or more valves 160 to open, close, or adjust the amount of hot water and/or cold water provided through the valve in order to adjust the temperature and/or flow rate of the water dispensed from each of mixing valves 160. In some embodiments, valve control module 672 is configured to control each of mixing valves 160 independently.

Valve control module 672 may generate the control signals by comparing the current output of each valve 160 to a setpoint. The setpoint may be a user-defined setpoint provided via network 240 or control panel 560, or a programmed setpoint defined by a programmed spa experience or other automated feature. The current output may be measured by one or more sensors configured to measure the temperature and/or flow rate of the water dispensed one or more of mixing valves 160. Valve control module 672 may use any of a variety of control techniques (e.g., proportional control, proportional-integral (PI) control, proportional-integral-differential (PID) control, model predictive control (MPC), pattern recognition adaptive control (PRAC), etc.) to determine an appropriate control signal for the mixing valves.

Each mixing valve 160 may be configured to affect the water dispensed from one or more water delivery devices. Valve control module 672 may use the stored water outlet configuration 662 to determine which mixing valves 160 correspond to a set of water delivery devices for which an adjustment is required. Valve control module 672 may then provide the generated control signals to the determined valves 160 via communications interface 680.

Memory 656 is shown to include a lighting control module 674, a steam control module 676, and an audio control module 678. Modules 674-678 may be similar to valve control module 672 in that they provide the functionality used by controller 610 to control various types of output devices. For example, lighting control module 674 may be configured to monitor and control lighting system 620, steam control module 676 may be configured to monitor and control steam system 630, and audio control module 678 may be configured to monitor and control audio system 640.

Modules 674-678 may be configured to receive feedback signals from systems 620-640 via communications interface 680 and to generate control signals for systems 620-640. In some instances, the control signals are based on user-defined setpoints or other user inputs provided via network 240 or control panel 560. For example, a user may provide an input to control panel 560 to increase or decrease a steam temperature setpoint or to turn on/off a lighting fixture. In other instances, the control signals are based on a programmed control sequence stored in memory 656 (e.g., a stored spa experience). Modules 674-678 may provide the generated control signals systems 620-640 via communications interface 680.

Figure 15:
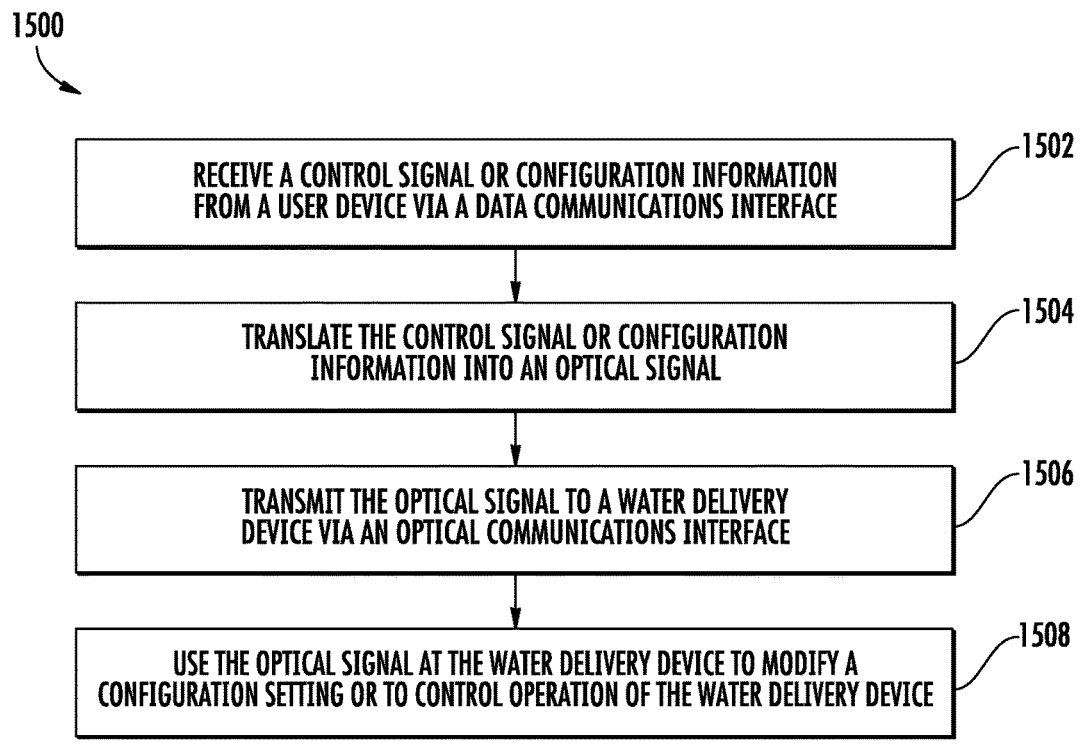
FIG. 15 is a flowchart of a process for controlling a water delivery device via an optical communications interface, according to an exemplary embodiment.

Referring now to FIG. 15, a flowchart of a process 1500 for controlling a water delivery device via an optical communications interface is shown, according to an exemplary embodiment. Process 1500 may be performed by faucet assembly 100 and/or communications bridge 200, as described with reference to FIGS. 9A-9B.

Process 1500 is shown to include receiving a control signal or configuration information from a user device via a data communications interface (step 1502). The control signal or configuration information may be received via a wireless or wired communications link (e.g., communications links 242 or 244) from a mobile device or a non-mobile device (e.g., devices 300-400). The control signal or configuration information may be received directly from the user device (e.g., via Bluetooth, NFC, a USB connection, etc.) or via an intermediate communications network (e.g., network 240). Process 1500 is shown to include translating the control signal or configuration information into an optical signal (step 1504) and transmitting the optical signal to a water delivery device via an optical communications interface (step 1506). Steps 1504-1506 may be performed by communications bridge 200, as described with reference to FIGS. 9A-9B. In some embodiments, the optical signal is an infrared (IR) signal and is transmitted via an IR communications interface.

Process 1500 is shown to include using the optical signal at the water delivery device to modify a configuration setting or to control operation of the water delivery device (step 1508). In some embodiments, the water delivery device translates the optical signal back to an electronic data value. The data value may be a configuration setting (e.g., a device configuration setting, a network configuration setting, a water outlet configuration, flush cycles, a disinfection schedule, etc.) or a control signal (e.g., a setpoint, an instruction to open or close a valve, etc.). The water delivery device may store the configuration setting in memory and/or use the control signal to operate a valve of the water delivery device.

Figure 16:
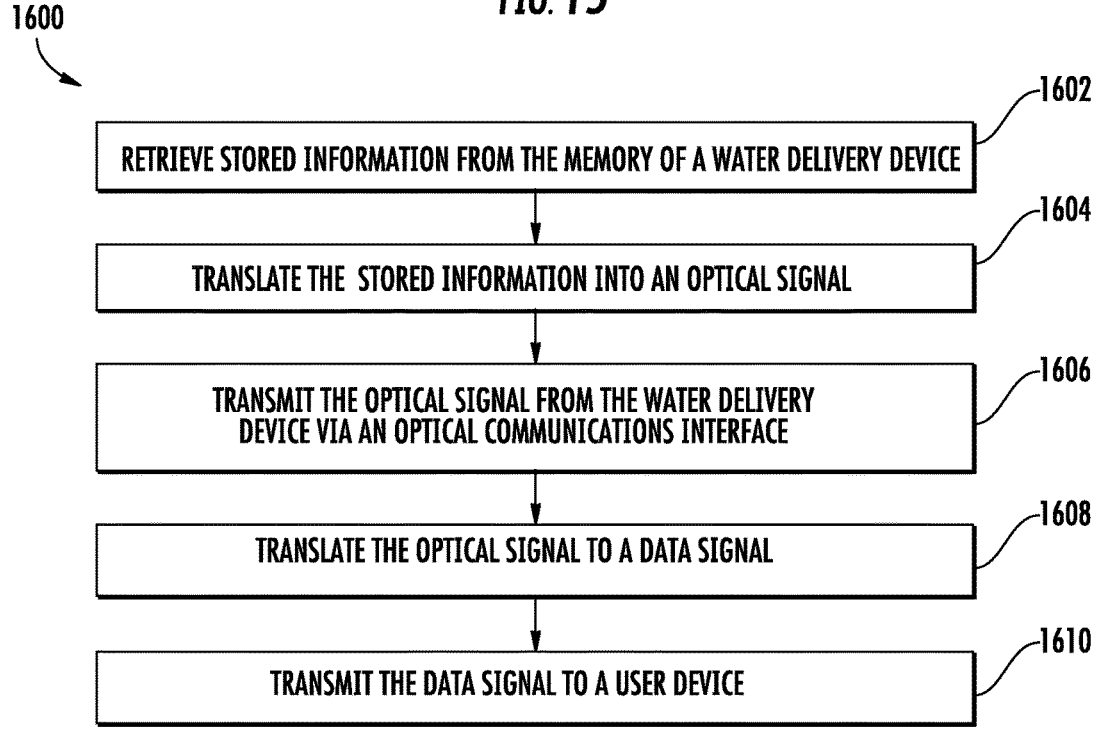
FIG. 16 is a flowchart of a process for retrieving information from a water delivery device via an optical communications interface, according to an exemplary embodiment.

Referring now to FIG. 16, a flowchart of a process 1600 for retrieving information from a water delivery device via an optical communications interface is shown, according to an exemplary embodiment. Process 1600 may be performed by faucet assembly 100 and/or communications bridge 200, as described with reference to FIGS. 9A-9B.

Process 1600 is shown to include retrieving stored information from the memory of a water delivery device (step 1602) and translating the stored information into an optical signal (step 1604). The stored information may include, for example, usage information and/or log data relating to the operation of the water delivery device. The optical signal may be transmitted from the water delivery device via an optical communications interface (step 1606). In some embodiments, the optical signal is transmitted to a communications bridge (e.g., communications bridge 200).

Process 1600 is shown to include translating the optical signal to a data signal (step 1608) and transmitting the data signal to a user device (step 1610). Steps 1608-1610 may be performed by communications bridge 200. The data signal may be transmitted directly to the user device (e.g., via Bluetooth, NFC, a USB connection, etc.) or via an intermediate communications network (e.g., network 240).

Figure 17:
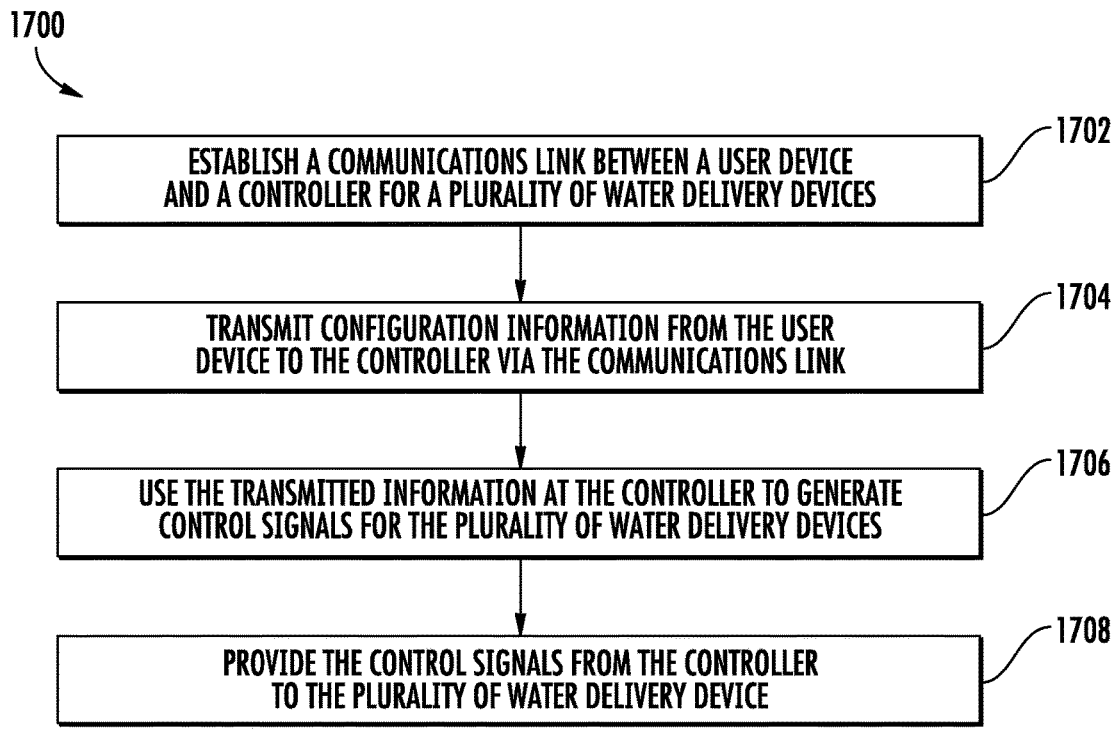
FIG. 17 is a flowchart of a process for programming a controller for a plurality of water delivery devices, according to an exemplary embodiment.

Referring now to FIG. 17, a flowchart of a process 1700 for programming a controller for a plurality of water delivery devices is shown, according to an exemplary embodiment. Process 1700 may be performed by shower control system 600 and/or control system 650, as described with reference to FIGS. 12-14.

Process 1700 is shown to include establishing a communications link between a user device and a controller for a plurality of water delivery devices (step 1702). In some embodiments, the controller is the same or similar to controller 610, as described with reference to FIGS. 12-14. The communications link may be a wired or wireless communications link, and may be a direct link or via an intermediate communications network (e.g., network 240). In various embodiments, the user device may be a mobile device (e.g., user device 300), a non-mobile device (e.g., device 400), or a control panel (e.g., control panel 560). The plurality of water delivery devices may be faucets, shower outlets, bath tub taps, or any other type of water delivery devices. The water delivery devices may be located in the same room or zone (e.g., within the same shower enclosure, as described with reference to FIGS. 11-12) or in different rooms or zones (e.g., different rooms of an apartment complex, office building, hospital, etc. as described with reference to FIG. 13).

In an alternative embodiment, the controller in step 1702 is a controller for a single water delivery device. For example, the controller may be the same or similar to controller 193, as described with reference to FIGS. 2-10B. The communications link established with such a controller may be a direct communications link (as shown in FIG. 10A), via an intermediate communications network (as shown in FIG. 10B), and/or via a communications bridge (as shown in FIGS. 9A-9B). The controller may be integrated with the water delivery device or separate from the water delivery device.

Process 1700 is shown to include transmitting configuration information from the user device to the controller via the communications link (step 1704). The configuration information may include, for example, device configuration settings 658, network configuration settings 660, water outlet configuration 662, flush cycles 664, disinfection schedules 666, setpoint adjustments, and/or any other type of configuration that may be used by the controller to control the water delivery device(s). In some instances, the configuration information includes control setpoints provided by the user device. The controller may store these and other types of configuration information within the memory of the controller for use in controlling the water delivery device(s), as described with reference to steps 1706-1708.

In some instances, the configuration information includes control signals or configuration information for the water delivery device(s). The controller may be configured to act as a communications bridge and relay these and other types of configuration information to the water delivery device(s). Relaying the configuration information may include, for example, translating the configuration information into a format or syntax that can be understood by the water delivery device(s) (e.g., translating the configuration information into optical light pulses) and transmitting the translated configuration information to the water delivery device(s). The water delivery device(s) may store the configuration information in a local memory thereof and/or use the configuration information to operate one or more valves (e.g., mixing valves 160) integrated with the water delivery device(s).

Process 1700 is shown to include using the transmitted information at the controller to generate control signals for the plurality of water delivery devices (step 1706) and providing the control signals from the controller to the plurality of water delivery devices (step 1708). Steps 1708 and 1710 may be performed when the configuration information is configuration information for the controller (e.g., setpoints for the controller) rather than configuration information for the water delivery devices. The control signals may be based on a difference between a setpoint (e.g., a temperature setpoint, a flow rate setpoint, etc.) included in the transmitted information and a measured value received as feedback from the plurality of water delivery devices. The control signals generated by the controller may be transmitted via a communications interface of the controller and used to control one or more mixing valves (e.g., valves 160) configured to affect the temperature and/or flow rate of the water dispensed from the water delivery devices.

Figure 18:
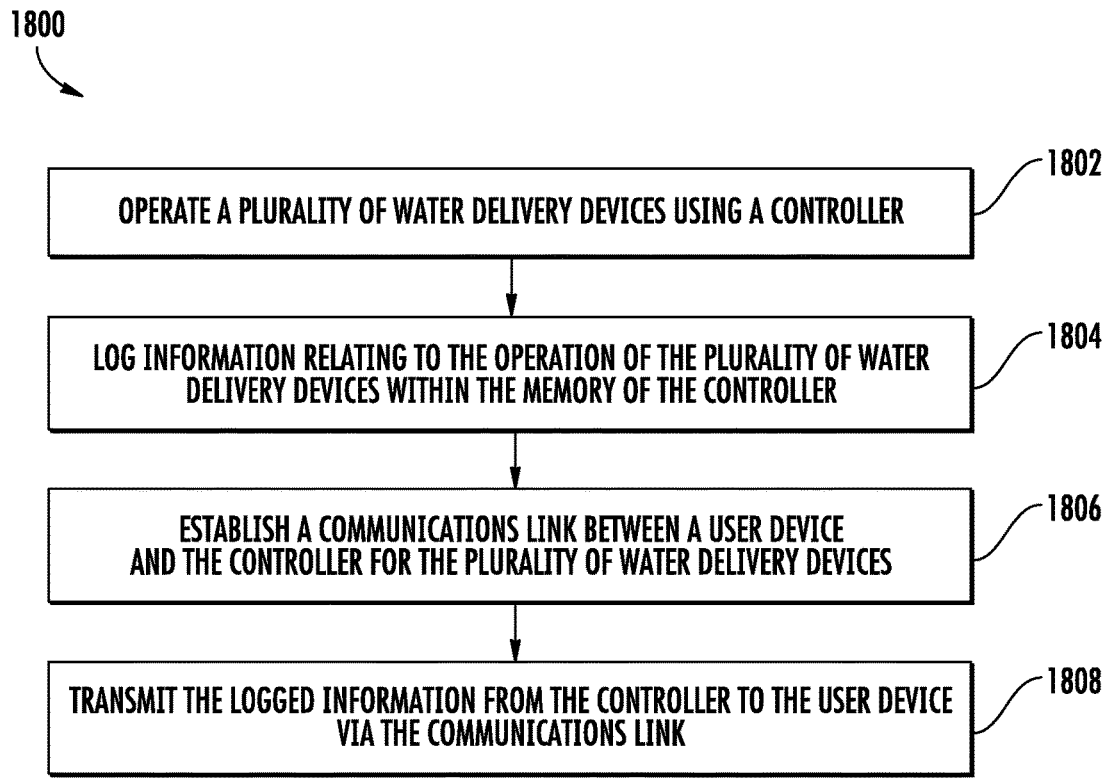
FIG. 18 is a flowchart of a process for retrieving information from a controller for a plurality of water delivery devices, according to an exemplary embodiment.

Referring now to FIG. 18, a flowchart of a process 1800 for retrieving information from a controller for a plurality of water delivery devices is shown, according to an exemplary embodiment. Process 1800 may be performed by shower control system 600 and/or control system 650, as described with reference to FIGS. 12-14.

Process 1800 is shown to include operating a plurality of water delivery devices using a controller (step 1802) and logging information relating to the operation of the plurality of water delivery devices within the memory of the controller (step 1804). The plurality of water delivery devices may be faucets, shower outlets, bath tub taps, or any other type of water delivery devices. The water delivery devices may be located in the same room or zone (e.g., within the same shower enclosure, as described with reference to FIGS. 11-12) or in different rooms or zones (e.g., different rooms of an apartment complex, office building, hospital, etc. as described with reference to FIG. 13). The logged information may include, for example, usage information and/or log data relating to the operation of the water delivery devices.

In various embodiments, the controller is integrated with one or more of the water delivery devices (e.g., controller 193) or separate from the water delivery devices (e.g., controller 610). The logged information may be stored within the local memory of the controller (e.g., in memory 656 or memory 191), within the local memory of the water delivery device, or both (e.g., for embodiments in which the controller and the water delivery device are integrated). For embodiments in which the logged information is stored within the local memory of a water delivery device separate from the controller, the logged information may be transmitted from the water delivery device to the controller via a wired or wireless communications link. The controller may be configured to log usage information for a plurality of water delivery devices operated by the controller.

Process 1800 is shown to include establishing a communications link between a user device and the controller for the plurality of water delivery devices (step 1806) and transmitting the logged information from the controller to the user device via the communications link (step 1808). The communications link may be a wired or wireless communications link, and may be a direct link or via an intermediate communications network (e.g., network 240). In various embodiments, the user device may be a mobile device (e.g., user device 300), a non-mobile device (e.g., device 400), or a control panel (e.g., control panel 560).

The user device may include an application or program configured to analyze the logged information to determine future cost allocation associated with water usage, to analyze previous usage trends, to determine optimized maintenance schedules, and/or to predict future water usage. In some embodiments, the user device generates an updated configuration setting based on the logged information (e.g., based on a result of the analysis) and sends the updated configuration setting to the controller and/or the water delivery device (e.g., as described in processes 1500 and 1700).

Figure 19:
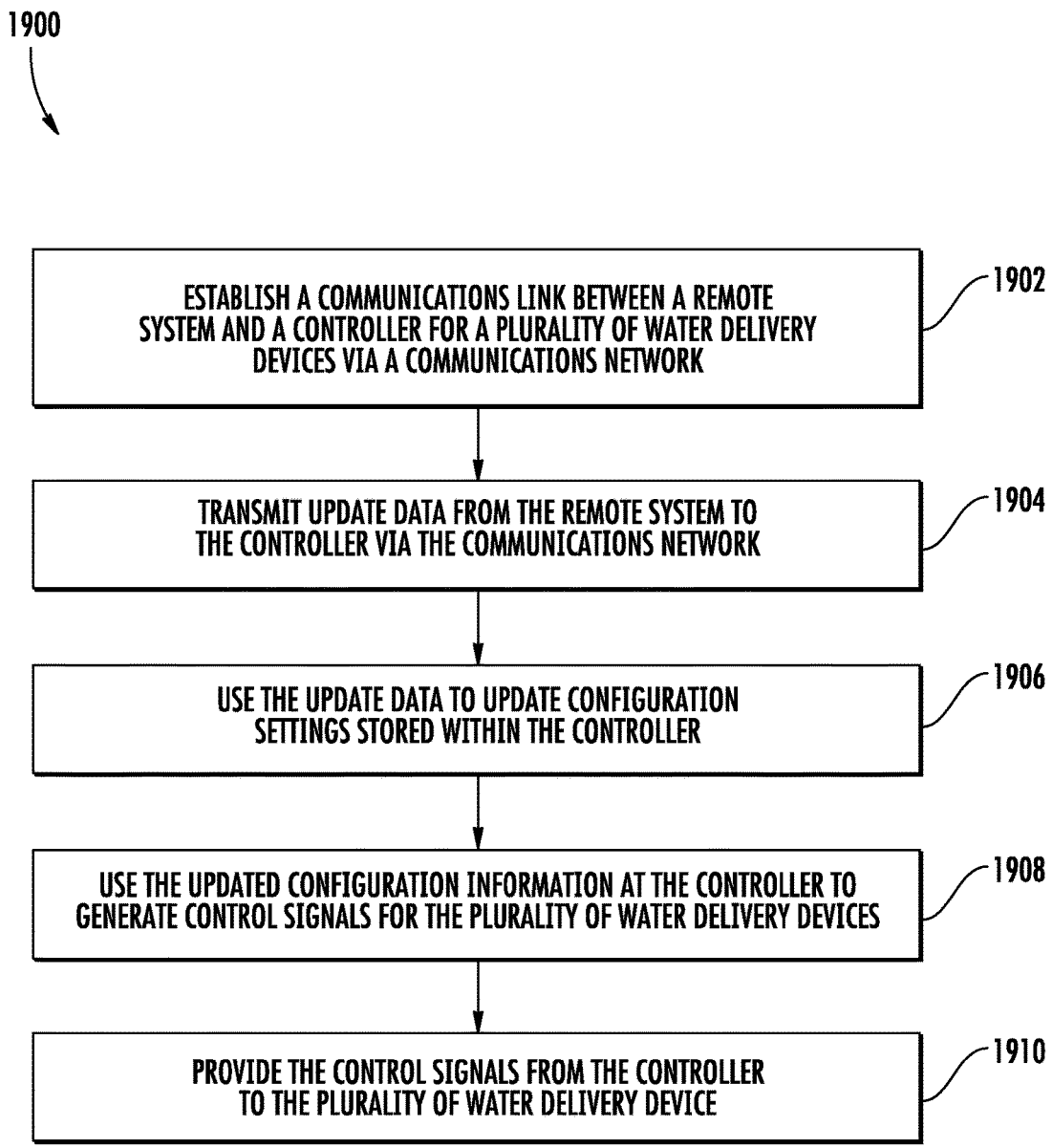
FIG. 19 is a flowchart of a process for updating a controller for a plurality of water delivery devices via a communications network, according to an exemplary embodiment.

Referring now to FIG. 19, a flowchart of a process 1900 for updating a controller for a plurality of water delivery devices is shown, according to an exemplary embodiment. Process 1900 may be performed by shower control system 600 and/or control system 650, as described with reference to FIGS. 12-14.

Process 1900 is shown to include establishing a communications link between a remote system and a controller for a plurality of water delivery devices via a communications network (step 1902). The communications link may be a wired or wireless communications link. The communications network (e.g., network 240) may be a LAN, a WAN, the Internet, a cellular network, a radio frequency network, and/or any other type of communications network. In some embodiments, the remote system is a computer server operated by a manufacturer of the controller and/or the shower control system.

In an alternative embodiment, the controller in step 1902 is a controller for a single water delivery device. For example, the controller may be the same or similar to controller 193, as described with reference to FIGS. 2-10B. The communications link established with such a controller may be a direct communications link (as shown in FIG. 10A), via an intermediate communications network (as shown in FIG. 10B), and/or via a communications bridge (as shown in FIGS. 9A-9B). The controller may be integrated with the water delivery device or separate from the water delivery device.

Process 1900 is shown to include transmitting update data from the remote system to the controller via the communications network (step 1904). In some instances, the update data includes update data for the controller. Such update data may include, for example, updated firmware, updated control software, updated spa experiences, updated user interfaces, updated configuration settings, updated control parameters, and/or any other type of updates which may be applied by the controller.

In some instances, the update data includes update data for the water delivery device(s). The controller may be configured to act as a communications bridge and relay these and other types of update data to the water delivery device(s). Relaying update data may include, for example, translating the update data into a format or syntax that can be understood by the water delivery device(s) (e.g., translating the update data into optical light pulses) and transmitting the translated configuration information to the water delivery device(s). The water delivery device(s) may store the update data in a local memory thereof and/or use the update data to update configuration settings stored within the water delivery device(s).

Process 1900 is shown to include using the update data to update configuration settings stored within the controller (step 1906). Step 1906 may be performed when the update data is update data for the controller. The configuration settings updated in step 1906 may include, for example, device configuration settings 658, network configuration settings 660, water outlet configuration 662, flush cycles 664, disinfection schedules 666, setpoint adjustments, and/or any other type of configuration that may be used by the controller to control the water delivery device(s). In some instances, the configuration settings include control setpoints provided by the remote server (e.g., temperature, timing, and/or flow rate settings for a programmed spa experience). The controller may store these and other types of configuration settings within the memory of the controller for use in controlling the water delivery device(s).

Process 1900 is shown to include using the updated configuration information at the controller to generate control signals for the plurality of water delivery devices (step 1908) and providing the control signals from the controller to the plurality of water delivery devices (step 1910). The control signals may be based on a difference between a setpoint (e.g., a temperature setpoint, a flow rate setpoint, etc.) included in the transmitted information and a measured value received as feedback from the plurality of water delivery devices. The control signals may be transmitted via a communications interface of the controller and used to control one or more mixing valves (e.g., valves 160) configured to affect the temperature and/or flow rate of the water dispensed from the water delivery devices.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present invention. For example, any element (e.g., first and second capacitive sensors, infrared sensors, mixing valve, etc.) disclosed in one embodiment may be incorporated or utilized with any other embodiment disclosed herein.

What is claimed is:

1. A water delivery device comprising:
a body including a spout;
a user interface provided on the spout;
a mixing valve contained within the body and configured to be in fluid communication with a hot water source and a cold water source;
a first capacitive sensor pad provided below the user interface;
a second capacitive sensor pad provided below the user interface laterally adjacent to the first capacitive sensor pad, wherein the second capacitive sensor pad is physically separated from the first capacitive sensor pad; and
a controller disposed within the body and configured, in response to a signal from the first or second capacitive sensor pads, to transmit a corresponding signal to the mixing valve to change a temperature of a flow of water flowing from the mixing valve;
wherein each of the first and second capacitive sensor pads is configured to be independently activated by a user to transmit the signal to the controller to change the temperature of the flow of water flowing from the mixing valve.

2. The water delivery device of claim 1, wherein the controller is configured to maintain a substantially constant flow rate of the flow of water flowing from the mixing valve during an adjustment of the temperature of the flow of water.

3. The water delivery device of claim 1, wherein when the first capacitive sensor pad is activated, the controller is configured to initiate a delay period during which the second capacitive sensor pad is not capable of being activated so as to prevent inadvertent activation of the second capacitive sensor pad, and wherein when the second capacitive sensor pad is activated, the controller is configured to initiate a delay period during which the first capacitive sensor pad is not capable of being activated so as to prevent inadvertent activation of the first capacitive sensor pad.

4. The water delivery device of claim 1, wherein the controller is configured to incrementally adjust the temperature of the flow of water flowing from the mixing valve in response to momentary or repeated activation of the first or the second capacitive sensor pads while maintaining a substantially constant flow rate of the flow of water.

5. The water delivery device of claim 1, wherein the mixing valve is an electronically controlled micro-mixing valve.

6. The water delivery device of claim 1, further comprising one or more light sources positioned below the user interface, wherein the one or more light sources are configured to provide a visual indication on the user interface of a temperature of a flow of water flowing from the water delivery device.

7. The water delivery device of claim 1, wherein the user interface includes a panel member, a graphics layer, and a substantially transparent outer layer, and wherein the substantially transparent outer layer is overmolded onto the panel member with the graphics layer disposed therebetween.

8. The water delivery device of claim 7, wherein each of the first and the second capacitive sensor pads is adhered to a rear inner surface of the panel member.

9. A faucet assembly comprising:
a body including a spout;
a user interface provided on the spout;
a mixing valve disposed in the body and configured to be in fluid communication with a hot water source and a cold water source;
a first capacitive sensor pad provided below the user interface on the spout and configured to increase a temperature of a flow of water flowing from the mixing valve;
a second capacitive sensor pad provided below the user interface on the spout laterally adjacent to the first capacitive sensor pad and configured to decrease the temperature of the flow of water flowing from the mixing valve, wherein the second capacitive sensor pad is physically separated from the first capacitive sensor pad; and
a controller operatively coupled to the first capacitive sensor pad, the second capacitive sensor pad, and the mixing valve;
wherein the controller is configured to receive a signal from the first or the second capacitive sensor pad and to transmit a corresponding signal to the mixing valve to control a flow of water from at least one of the hot water source or the cold water source so as to change the temperature of the flow of water flowing from the mixing valve; and
wherein each of the first and second capacitive sensor pads is configured to be independently activated by a user to transmit the signal to the controller to change the temperature of the flow of water flowing from the mixing valve.

10. The water delivery device of claim 9, Wherein the controller is configured to maintain a substantially constant flow rate of the flow of water flowing from the mixing valve during an adjustment of the temperature of the flow of water.

11. The water delivery device of claim 9, wherein when the first capacitive sensor pad is activated, the controller is configured to initiate a delay period during which the second capacitive sensor pad is not capable of being activated so as to prevent inadvertent activation of the second capacitive sensor pad, and wherein when the second capacitive sensor pad is activated, the controller is configured to initiate a delay period during which the first capacitive sensor pad is not capable of being activated so as to prevent inadvertent activation of the first capacitive sensor pad.

12. The water delivery device of claim 9, wherein the controller is configured to incrementally adjust the temperature of the flow of water flowing from the mixing valve in response to momentary or repeated activation of the first or the second capacitive sensor pads while maintaining a substantially constant flow rate of the flow of water.

13. The water delivery device of claim 9, wherein the mixing valve is an electronically controlled micro-mixing valve.

14. The water delivery device of claim 9, further comprising one or more light sources positioned below the user interface, wherein the one or more light sources are configured to provide a visual indication on the user interface of a temperature of a flow of water flowing from the water delivery device.

15. The water delivery device of claim 9, wherein the user interface includes a panel member, a graphics layer, and a substantially transparent outer layer, and wherein the substantially transparent outer layer is overmolded onto the panel member with the graphics layer disposed therebetween.

16. The water delivery device of claim 15, wherein each of the first and the second capacitive sensor pads is adhered to a rear inner surface of the panel member.

17. A water delivery device comprising:
a spout;
a mixing valve configured to be in fluid communication with a hot water source and a cold water source;
a first capacitive sensor pad provided in the spout and configured to increase a temperature of a flow of water flowing from the mixing valve;
a second capacitive sensor pad provided in the spout laterally adjacent to the first capacitive sensor pad, wherein the second capacitive sensor pad is physically separated from the first capacitive sensor pad and is configured to decrease the temperature of the flow of water; and
a controller operatively coupled to the mixing valve, the first capacitive sensor pad, and the second capacitive sensor pad;
wherein each of the first and second capacitive sensor pads is configured to be independently activated by a user to control a flow of water from at least one of the hot water source and the cold water source to adjust a temperature of the flow of water.

\* \* \* \* \*